United States Patent
Kanetake et al.

(10) Patent No.: US 9,734,416 B2
(45) Date of Patent: Aug. 15, 2017

(54) OBJECT DETECTION METHOD, INFORMATION PROCESSING DEVICE, AND STORAGE MEDIUM

(71) Applicant: FUJITSU LIMITED, Kawasaki-shi, Kanagawa (JP)

(72) Inventors: Jun Kanetake, Kawasaki (JP); Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 40 days.

(21) Appl. No.: 15/018,002

(22) Filed: Feb. 8, 2016

(65) Prior Publication Data

US 2016/0283803 A1    Sep. 29, 2016

(30) Foreign Application Priority Data

Mar. 23, 2015 (JP) ................... 2015-058930

(51) Int. Cl.
*G06K 9/00* (2006.01)
*G06T 7/269* (2017.01)

(52) U.S. Cl.
CPC ........ *G06K 9/00805* (2013.01); *G06T 7/269* (2017.01); *G06T 2207/10016* (2013.01); *G06T 2207/30241* (2013.01); *G06T 2207/30261* (2013.01)

(58) Field of Classification Search
CPC .......... G06K 9/00805; G06T 7/269; G06T 2207/10016; G06T 2207/30241; G06T 2207/30261
USPC ........................................ 382/103
See application file for complete search history.

(56) References Cited

U.S. PATENT DOCUMENTS

| 2012/0027258 | A1 | 2/2012 | Uchida et al. | |
|---|---|---|---|---|
| 2012/0327238 | A1* | 12/2012 | Satoh | B60R 1/00 |
| | | | | 348/148 |
| 2013/0148848 | A1* | 6/2013 | Lee | G06K 9/00771 |
| | | | | 382/103 |

FOREIGN PATENT DOCUMENTS

| JP | 2006-134035 | 5/2006 |
|---|---|---|
| JP | 2007-334859 | 12/2007 |
| JP | 2010-204805 | 9/2010 |
| JP | 2010-257138 | 11/2010 |

* cited by examiner

*Primary Examiner* — Amandeep Saini
(74) *Attorney, Agent, or Firm* — Oblon, McClelland, Maier & Neustadt, L.L.P.

(57) ABSTRACT

An object detection method includes extracting an object candidate by grouping a plurality of characteristic points from two images acquired at different times by a camera; calculating, for each of characteristic points included in the object candidate, an observation flow amount indicating an amount of positional shift on the two images and a virtual road surface flow amount indicating an amount of positional shift on the two images while assuming that the characteristic point is located on a road surface; generating, for each of the characteristic points, a flow difference distribution of the object candidate by calculating a difference between the observation flow amount and the virtual road surface flow amount; and determining whether the object candidate is an object existing on and protruding from the road surface by comparing the flow difference distribution with a plurality of flow difference distribution models generated for predicted inclined states of the surface.

10 Claims, 25 Drawing Sheets

FIG. 6

| COORDINATES (X,Y) | OBJECT NUMBER |
|---|---|
| ⋮ | ⋮ |
| (1223,0905) | 0214 |
| (1223,0906) | 0214 |
| ⋮ | ⋮ |
| (1970,1108) | 0601 |
| (1970,1109) | 0601 |
| (1970,1110) | |
| ⋮ | ⋮ |

CUBIC OBJECT AND
FLAT ROAD SURFACE

ROAD SURFACE PATTERN
AND FLAT ROAD SURFACE

ROAD SURFACE PATTERN
AND ASCENDING SLOPE

ROAD SURFACE PATTERN
AND DESCENDING SLOPE

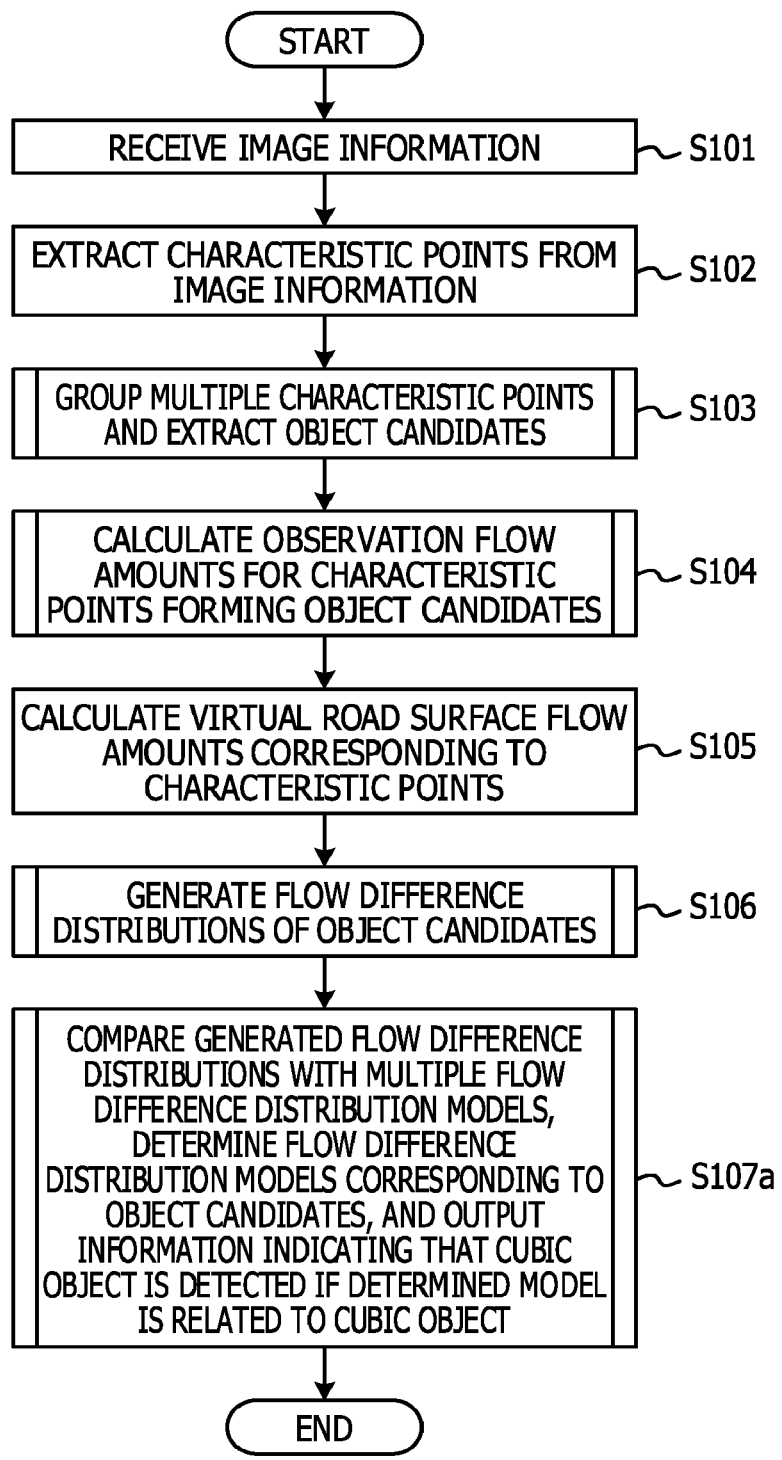

OBJECT DETECTION METHOD, INFORMATION PROCESSING DEVICE, AND STORAGE MEDIUM

CROSS-REFERENCE TO RELATED APPLICATION

This application is based upon and claims the benefit of priority of the prior Japanese Patent Application No. 2015-058930, filed on Mar. 23, 2015, the entire contents of which are incorporated herein by reference.

FIELD

The embodiments discussed herein are related to an object detection method, an information processing device, and a storage medium.

BACKGROUND

In recent years, a safety support system that uses a camera attached to a moving object such as a vehicle to image an external environment has been widely used. When the moving object goes backward for parking or the like, and the safety support system detects, from an image acquired by the camera and depicting an external environment, the existence of an object (cubic object) that may obstruct the movement, the safety support system may notify that the object exists.

As a method of detecting the existence of a cubic object from an image acquired by the camera and depicting an external environment, a method using an optical flow expressing a motion of an object within a digital image by vectors is known, for example. According to this method, multiple temporarily continuous images depicting an external environment are acquired and the amounts (observation flow amounts) of positional shifts of characteristic points extracted from the images acquired at two times are extracted. If the observation flow amounts are larger than the amounts (virtual road surface flow amounts) of positional shifts of characteristic points on a road surface, it is determined that the corresponding characteristic points are points of a cubic object. The method using the optical flow uses a characteristic in which the amount of a motion of a cubic object is larger than the amount of a motion of an image (hereinafter referred to as road surface pattern) of a pattern painted on a road surface or the like. As related art, Japanese Laid-open Patent Publications Nos. 2006-134035, 2007-334859, 2010-204805, 2010-257138, and the like are disclosed, for example.

The aforementioned method, however, assumes that the road surface is flat. For example, if the road surface includes a slope, the road surface pattern may be erroneously detected as a cubic object. Thus, even if the road surface includes the slope, it is desirable that a cubic object be accurately detected without erroneous detection.

SUMMARY

According to an aspect of the invention, an object detection method executed by a processor included in an object detecting device having a camera attached to a moving object, the object detection method includes extracting a plurality of characteristic points from two images acquired at different times by the camera upon a movement of the moving object; extracting an object candidate by grouping the plurality of characteristic points; calculating, for each of characteristic points included in the object candidate, an observation flow amount indicating an amount of positional shift of a characteristic point on the two images; calculating, for each of the characteristic points included in the object candidate, a virtual road surface flow amount indicating an amount of positional shift of the characteristic point on the two images while assuming that the characteristic point is located on a road surface; generating, for each of the characteristic points included in the object candidate, a flow difference distribution of the object candidate by calculating a difference between the observation flow amount and the virtual road surface flow amount; and determining whether the object candidate is an object existing on and protruding from the road surface by comparing the flow difference distribution with a plurality of flow difference distribution models generated for predicted inclined states of the surface and corresponding to at least any of a case where the object candidate is the object existing along the road surface and a case where the object candidate is the object existing on and protruding from the road surface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of an object number DB;

FIG. 24 is a flowchart of an example of a method of detecting a cubic object by an object detecting device according to a second embodiment.

DESCRIPTION OF EMBODIMENTS

Hereinafter, embodiments are described in detail with reference to FIGS. 1 to 25.

As an example of each of object detecting devices according to the embodiments, a safety support system for a vehicle is described. The embodiments, however, are not limited to this and are applicable to an information processing devices configured to detect an object.

First Embodiment

Figure 1:
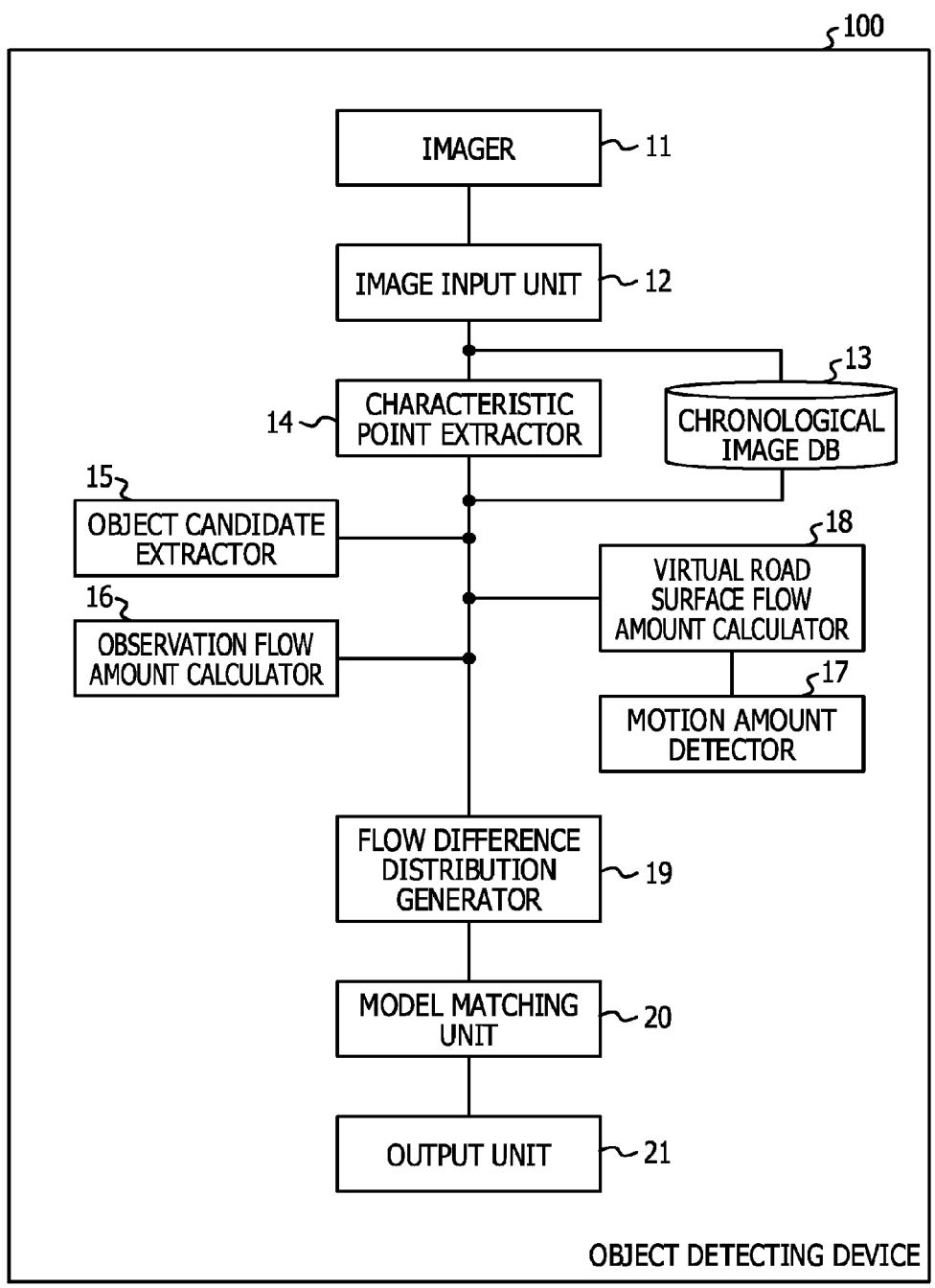
FIG. 1 is a diagram illustrating an example of functional blocks of an object detecting device according to a first embodiment.

FIG. 1 is a diagram illustrating an example of functional blocks of an object detecting device according to a first embodiment. As illustrated in FIG. 1, an object detecting device 100 is achieved by an information processing device such as a computer and is attached to a moving object such as a vehicle, for example. The object detecting device 100 includes an imager 11, an image input unit 12, a chronological image database (DB) 13, a characteristic point extractor 14, an object candidate extractor 15, an observation flow amount calculator 16, a motion amount detector 17, a virtual road surface flow amount calculator 18, a flow difference distribution generator 19, a model matching unit 20, and an output unit 21. Functions of the parts are described below.

The imager 11 is a device having a function of acquiring an image. The imager 11 may acquire images of an external environment of the moving object.

The image input unit 12 receives, as image information, information of the images acquired by the imager 11 and depicting the external environment of the moving object. The image input unit 12 converts the received image information into digital image information, causes the digital image information to be stored in the chronological image DB 13 after the conversion, and outputs the image information to the characteristic point extractor 14.

The chronological image DB 13 stores the image information received by the image input unit 12. In general, a capacity for storing information in the chronological image DB 13 is limited. Thus, it is preferable that images stored in the chronological image DB 13 be managed so that an image is stored in the chronological image DB 13 for each certain distance (of, for example, 50 centimeters) of a movement of the moving object upon the movement of the moving object. Alternatively, it is preferable that the images stored in the chronological image DB 13 be managed so that if the amount of a movement of the moving object from a position at which the oldest image among the images stored in the chronological image DB 13 is acquired becomes a predetermined value (of, for example, 3 meters), the oldest image is deleted. By managing the images stored in the chronological image DB 13 in any of the methods, the capacity of the chronological image DB 13 may be effectively used.

The characteristic point extractor 14 extracts characteristic points within the images from the images received from the image input unit 12. The characteristic points indicate characteristics such as a boundary of an object within the images and sharply and gently curved points of a contour of the object. A method of extracting the characteristic points is described later. The characteristic point extractor 14 transmits information of the extracted characteristic points to the object candidate extractor 15.

The object candidate extractor 15 extracts, based on the information indicating the characteristic points and received from the characteristic point extractor 14, an object candidate that is a candidate for a cubic object to be detected by the object detecting device. The cubic object is an object existing on and protruding from a road surface (movement surface) on which the moving object moves, for example. The object candidate is formed by grouped multiple characteristic points. A method of extracting object candidates is described later.

The observation flow amount calculator 16 calculates, as observation flow amounts, the amounts of motions between multiple characteristic points that are included in the object candidate extracted by the object candidate extractor 15 and are depicted on an image acquired at the latest time t2 and multiple characteristic points that are included in the object candidate extracted by the object candidate extractor 15 and are depicted on an image acquired at a past time t1. A method of extracting the observation flow amounts is described later.

The motion amount detector 17 detects the amount of a movement of the moving object between the aforementioned two times. The information detected by the motion amount detector 17 is used for the calculation of virtual road surface flow amounts that are described later. The motion amount detector 17 may be achieved by a vehicle velocity sensor, a steering angle sensor, or the like, for example.

The virtual road surface flow amount calculator 18 uses information of the amount, detected by the motion amount detector 17, of the movement of the moving object to calculate the virtual road surface flow amounts or the amounts of positional shifts of characteristic points while assuming that the characteristic points are on a road surface. A method of calculating the virtual road surface flow amounts is described later.

The flow difference distribution generator 19 calculates flow differences that are differences between the observation flow amounts calculated by the observation flow amount calculator 16 and the virtual road surface flow amounts calculated by the virtual road surface flow amount calculator 18 for the multiple characteristic points included in the object candidate. Then, the flow difference distribution generator 19 generates a flow difference distribution that is a distribution of the flow differences of the object candidate in a graph with an ordinate indicating a direction of the height of the objective candidate depicted in the images and an abscissa indicating a flow difference.

The model matching unit 20 generates, based on positional coordinates of the object candidate on a screen, multiple flow difference distribution models for combinations of object candidate types and road surface's inclined state types. The object candidate types are two types, a cubic object and a pattern (road surface pattern) of a road surface. The road surface pattern is an object existing along the road surface (movement surface) on which the moving object moves. The road surface pattern is, for example, paint such as a line painted on the road surface. The road surface's inclined state types are three types, a flat surface, an ascending slope, and a descending slope. The object candidate types and the road surface's inclined state types are not limited to the aforementioned examples, and the number of the object candidate types and the number of the road surface's inclined state types are not limited to the aforementioned numbers. For example, the model matching unit 20 may generate a flow difference distribution model for each of ascending slopes whose inclination angles are different.

The model matching unit 20 compares the flow difference distribution, generated by the flow difference distribution generator 19, of the object candidate with the multiple flow difference distribution models generated by the model matching unit 20. Then, the model matching unit 20 determines, as a flow difference distribution model corresponding to the object candidate, a flow difference distribution model that is among the multiple flow difference distribution models and is the most similar model to the flow difference distribution of the object candidate. Then, the model matching unit 20 may determine, based on the type of the determined flow difference distribution model, whether or not the object candidate is a cubic object. The model matching unit 20 may be divided into a matching unit configured to compare a flow difference distribution of an object candidate with multiple flow difference distribution models and a determining unit configured to determine, based on the results of the matching, whether or not the object candidate is a cubic object.

The output unit 21 is a device that outputs results of a process executed by the object detecting device 100. If the model matching unit 20 determines that the object candidate is a cubic object as a result of the matching process executed by the model matching unit 20, the output unit 21 outputs information indicating that the object candidate is a cubic object. A user of the object detecting device 100 may receive the output information upon a backward movement of the moving object and thereby recognize that the cubic object exists on the road on which the moving object moves.

Next, a hardware configuration of the object detecting device 100 is described.

Figure 2:
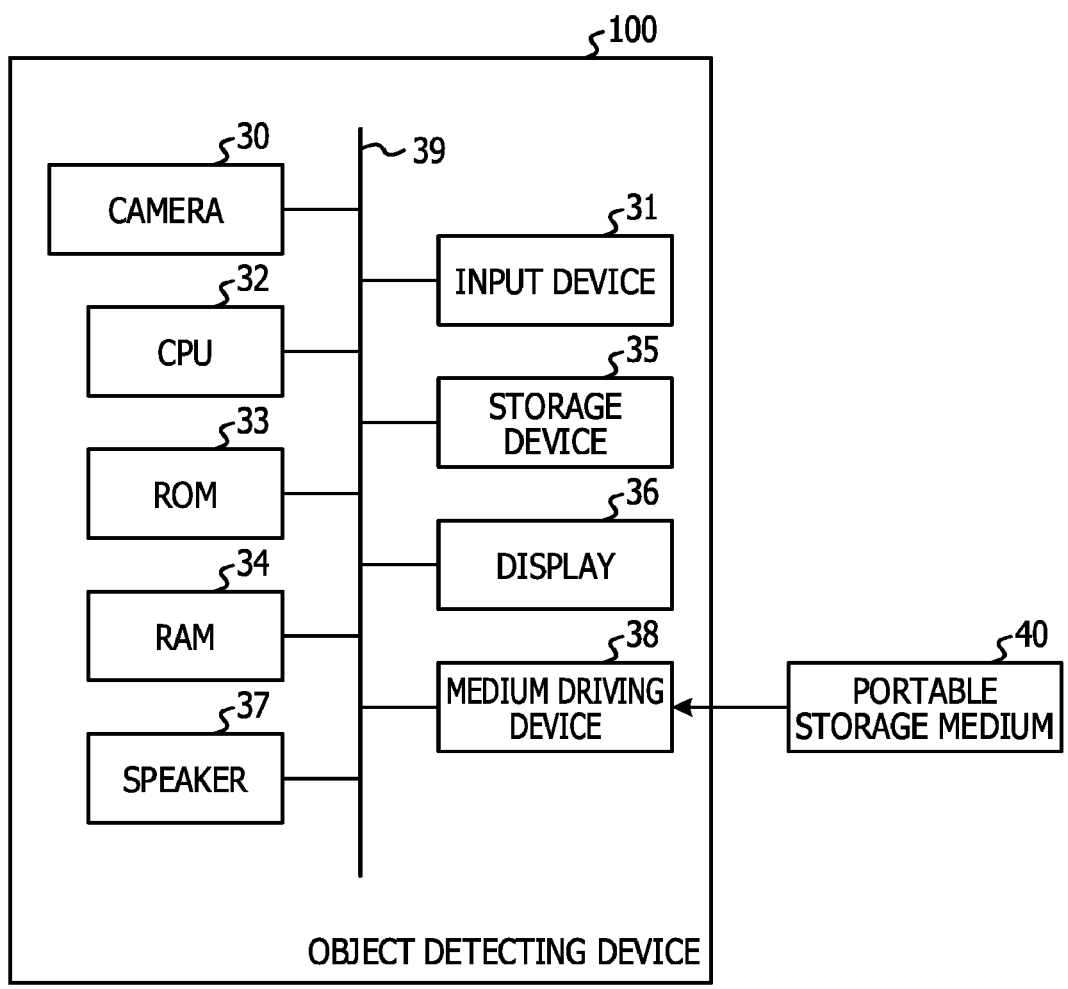
FIG. 2 is a diagram illustrating an example of a hardware configuration of the object detecting device according to the first embodiment.

FIG. 2 is a diagram illustrating an example of the hardware configuration of the object detecting device 100. As illustrated in FIG. 2, the object detecting device 100 includes a camera 30, an input device 31, a central processing unit (CPU) 32, a read only memory (ROM) 33, a random access memory (RAM) 34, a storage device 35, a display 36, a speaker 37, and a medium driving device 38.

The camera 30 is an example of the imager 11 illustrated in FIG. 1. The camera 30 is a monocular imaging device fixed to at least any of front, back, left, and right portions of the moving object, for example. The number of cameras 30 attached to the moving object is not limited to 1 and may be 2 or more.

The input device 31 is a device configured to acquire information input based on an operation performed by the user of the object detecting device 100 upon the operation and transmit the acquired information to the CPU 32. The input device 31 may be a keyboard, a mouse, a touch panel, or the like.

The CPU 32 is an arithmetic processing device configured to execute a process of controlling operations of the overall object detecting device 100. The operations of the functional blocks illustrated in FIG. 1 are achieved by the CPU 32. The CPU 32 may be achieved by a micro processing unit (MPU).

The ROM 33 is a nonvolatile storage device configured to store a program (including an information processing program) for controlling the operations of the object detecting device 100. The RAM 34 is a volatile storage device that may be used as a work area upon the execution of the program. The storage device 35 is a hard disk drive (HDD) or the like, for example. The storage device 35 may store various control programs to be executed by the CPU 32 and store acquired data.

The display 36 is an example of the output unit 21 illustrated in FIG. 1. The display 36 is a display device that displays an image obtained by imaging an external environment and displays the results of the process executed by the object detecting device 100. The display 36 is, for example, a liquid crystal display, a plasma display, an organic electroluminescence (EL) display, or the like. The speaker 37 is an example of the output unit 21 illustrated in FIG. 1 and is a part for outputting audio information. The speaker 37 may output a sound to notify the user that the object detecting device 100 detected a cubic object on the road on which the moving object moves.

The medium driving device 38 writes data in a portable storage medium 40 and executes data read from the portable storage medium 40. The CPU 32 may read the predetermined control program stored in the portable storage medium 40 through the medium driving device 38, execute the predetermined control program, and thereby execute the process of controlling the operations of the object detecting device 100. The portable storage medium 40 is, for example, a compact disc-ROM (CD-ROM), a digital versatile disc (DVD), a Universal Serial Bus (USB) memory, or the like.

The constituent units of the object detecting device 100 are connected to a bus 39. The bus 39 is a communication path through which data is transmitted and received between the hardware units.

Next, a method of detecting a cubic object by the object detecting device 100 is described.

Figure 3:
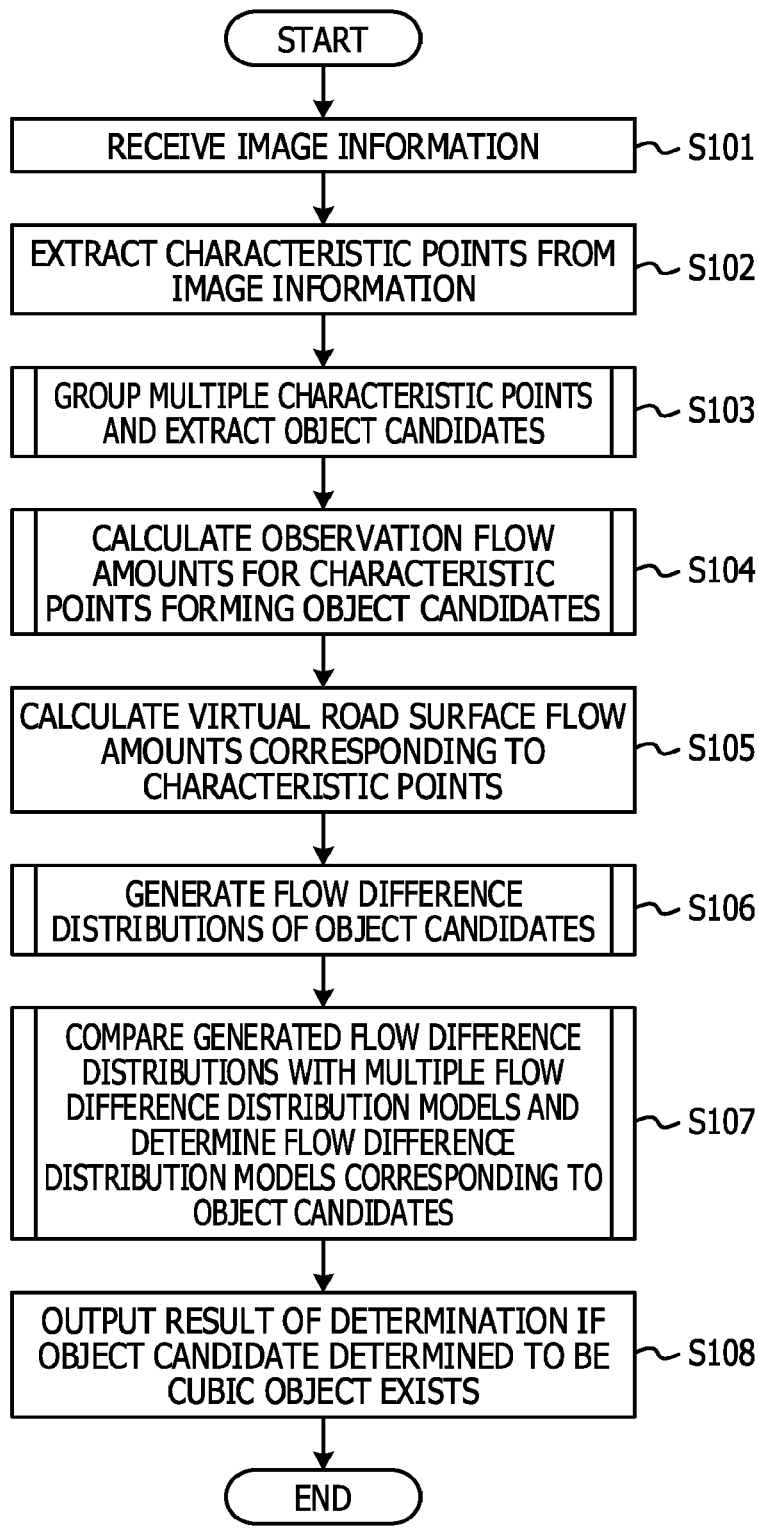
FIG. 3 is a flowchart of an example of a method of detecting a cubic object by the object detecting device according to the first embodiment.

FIG. 3 is a flowchart of an example of the method of detecting a cubic object by the object detecting device according to the first embodiment.

First, the imager 11 attached to the moving object acquires images of an external environment of the moving object. Then, the image input unit 12 receives information of the acquired images from the imager 11 (in S101). If the received image information is analog images, the image input unit 12 converts the analog images into digital images. If the received image information is color images, the image input unit 12 converts the analog images into digital images and converts the digital images into monochrome images. The image input unit 12 associates the received image information of the digital images with times when the images are acquired, and the image input unit 12 causes the image information to be stored in the chronological image DB 13.

Subsequently, the characteristic point extractor 14 extracts characteristic points from the image information (in S102). In S102, the characteristic point extractor 14 reads the image information from the chronological image DB 13 and executes edge extraction. Specifically, for example, the characteristic point extractor 14 uses a general Sobel operator to execute differential processing on the image information. Then, the characteristic point extractor 14 compares edge intensities obtained by the differential processing with a predetermined edge intensity threshold and extracts edge intensities that are equal to or larger than the threshold. Then, the characteristic point extractor 14 compares the extracted edge intensities with edge intensities of two pixels that are located adjacent to each of pixels having the extracted edge intensities in a lateral direction. If the extracted edge intensities are equal to a peak value, the characteristic point extractor 14 executes a thinning process of treating edges having the edge intensities as edge points. Then, the characteristic point extractor 14 treats the multiple edge points obtained by the thinning process as characteristic points and outputs information of the multiple characteristic points to the object candidate extractor 15.

Subsequently, the object candidate extractor 15 virtually couples the characteristic points to each other based on the information received from the characteristic point extractor 14 and indicating the multiple characteristic points, groups the multiple characteristic points by the coupling, and extracts object candidates (in S103). A method of extracting the object candidates is described below.

Figure 4:
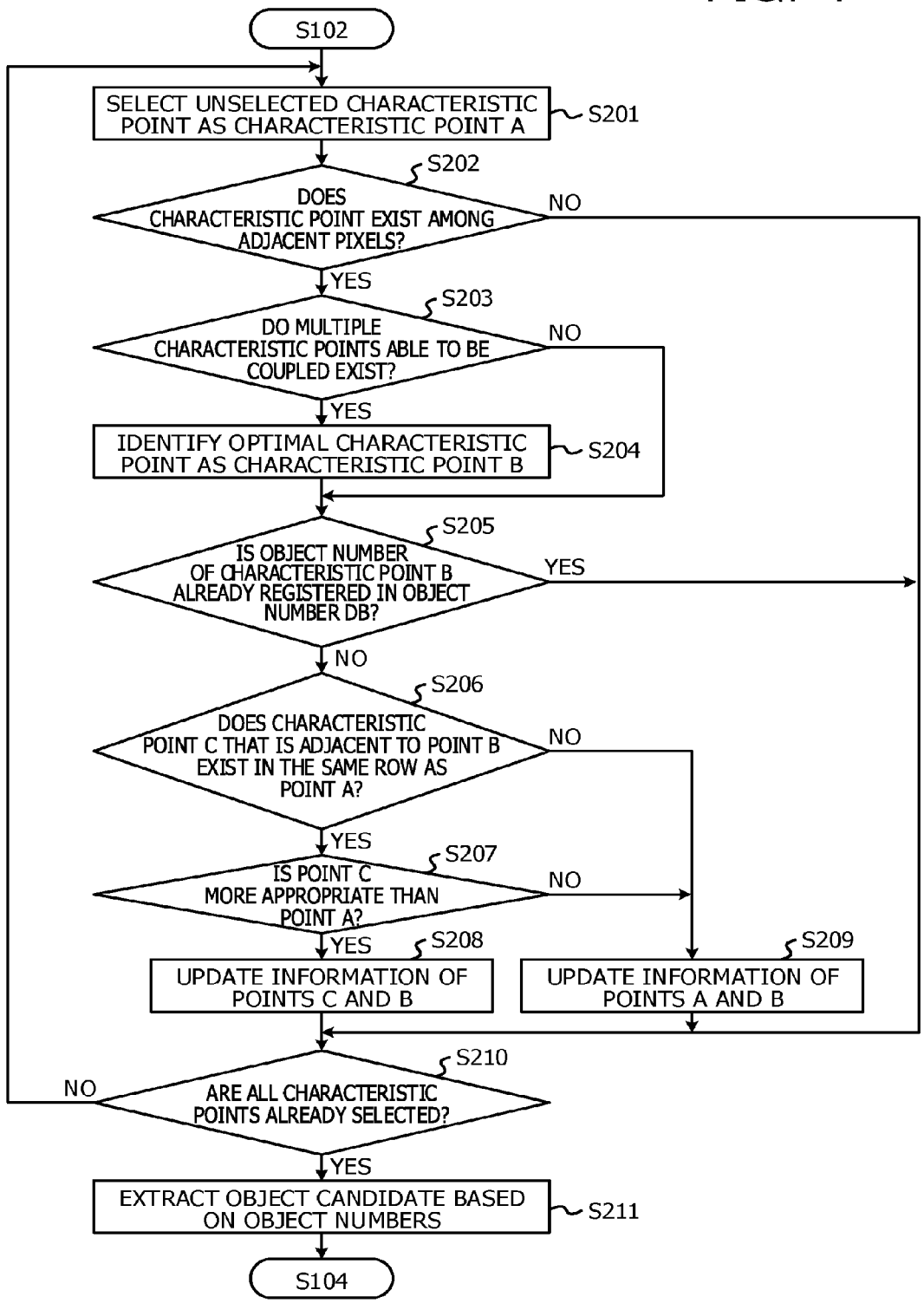
FIG. 4 is a flowchart of an example of a method of extracting object candidates.
Figure 5A:
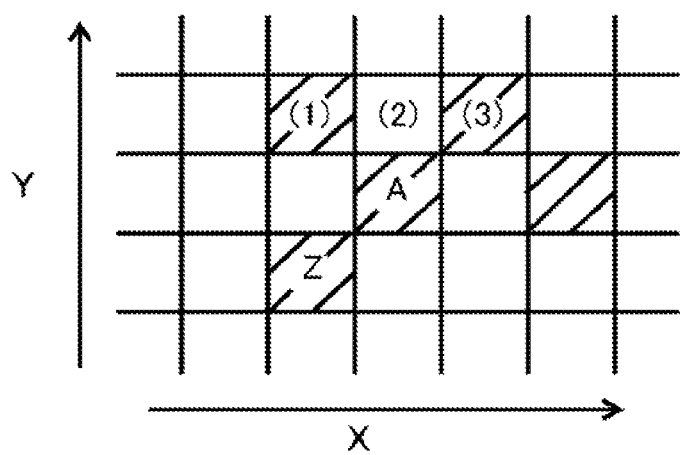
FIGS. 5A, 5B, and 5C are diagrams describing the method of extracting object candidates.
Figure 5B:
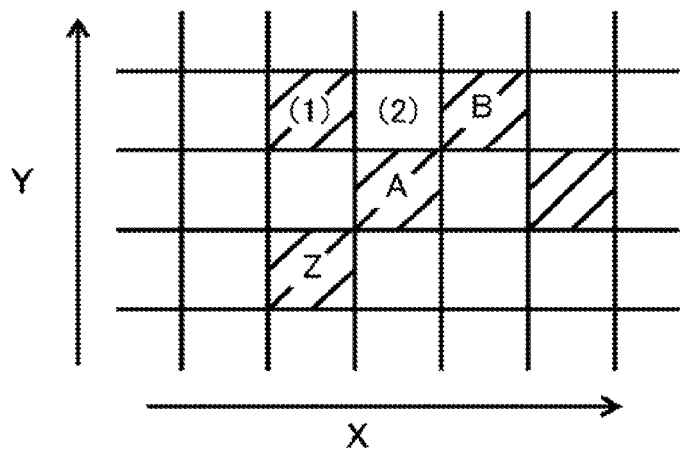
Figure 5C:
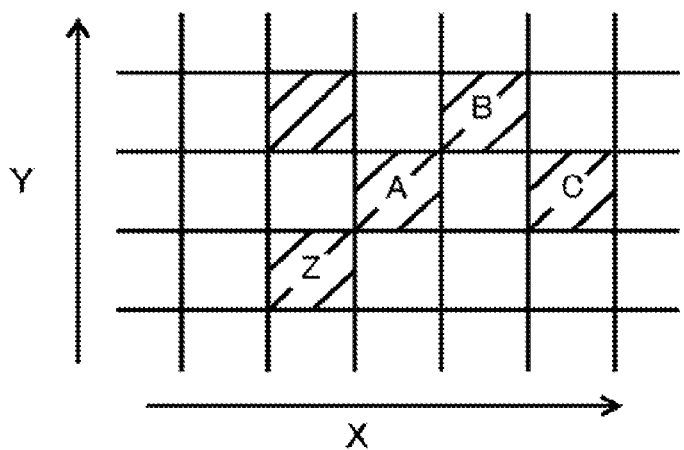

FIG. 4 is a flowchart of an example of the method of extracting the object candidates according to the first embodiment. FIGS. 5A, 5B, and 5C are diagrams describing the method of extracting the object candidates. Square cells illustrated in FIGS. 5A, 5B, and 5C indicate pixels forming an image. As illustrated in FIGS. 5A, 5B, and 5C, the multiple pixels are two-dimensionally arranged in a matrix form. Pixels indicated by diagonal lines indicate characteristic points (edge points), respectively. In the following description, each group of pixels arranged along X axis in FIGS. 5A, 5B, and 5C is defined as a "row". In other words, pixels that have the same Y coordinate belong to the same row. Each group of pixels arranged along Y axis in FIGS. 5A, 5B, and 5C is defined as a "column". In other words, pixels that have the same X coordinate belong to the same column.

First, as illustrated in FIG. 5A, the object candidate extractor 15 selects an unselected characteristic point A from among multiple pixels (or characteristic points) (in S201).

Subsequently, the object candidate extractor 15 determines whether or not a characteristic point exists among three pixels that are adjacent to the characteristic point A and belong to a row that has a larger Y coordinate than the characteristic point A and is adjacent to a row to which the characteristic point A belongs (in S202). In the example illustrated in FIG. 5A, pixels (1), (2), and (3) correspond to the aforementioned three pixels. If the object candidate extractor 15 determines that a characteristic point does not exist among the three pixels adjacent to the characteristic point A (No in S202), the process proceeds to S210. If the object candidate extractor 15 determines that a characteristic point exists among the three pixels adjacent to the characteristic point A (Yes in S202), the object candidate extractor 15 determines whether or not the number of characteristic points able to be coupled to the characteristic point A is two or more (in S203). In the example illustrated in FIG. 5A, the pixels (1) and (3) are characteristic points (indicated by diagonal lines), the answer to the determination of S202 is affirmative, and the process proceeds to S203.

If the object candidate extractor 15 determines that the number of characteristic points able to be coupled to the characteristic point A is not two or more (No in S203), the process proceeds to S205. On the other hand, if the object candidate extractor 15 determines that the number of characteristic points able to be coupled to the characteristic point A is two or more (Yes in S203), the object candidate extractor 15 compares angles between lines obtained by coupling the characteristic point A to the characteristic points able to be coupled to the characteristic point A and other lines terminated at the characteristic point A. Then, as illustrated in FIG. 5B, the object candidate extractor 15 selects, as a characteristic point B from among the multiple characteristic points able to be coupled to the characteristic point A, an optimal point to be coupled to the characteristic point A (in S204).

In the example illustrated in FIG. 5B, the number of characteristic points able to be coupled to the characteristic point A is 2, the answer to the determination of S203 is affirmative, and the process proceeds to S204. In S204, the pixels (1) and (3) are candidates for the characteristic point B. A characteristic point Z exists on the lower left side of the characteristic point A and is identified as a characteristic point to be coupled to the characteristic point A. In this case, the object candidate extractor 15 does not select the pixel (1) forming a line curved at an angle of 90 degrees at the characteristic point A upon the coupling and selects, as the characteristic point B, the pixel (3) to be coupled through the characteristic point A to the characteristic point Z in a straight manner. After S204, the process proceeds to S205.

In S205, the object candidate extractor 15 determines whether or not an object number of the characteristic point B is already registered in an object number DB (in S205).

FIG. 6 is a diagram illustrating an example of the object number DB. As illustrated in FIG. 6, object numbers and coordinates (X, Y) indicating information of the positions of pixels are associated and registered in the object number DB. In a coordinate column, the coordinates of all the pixels are stored. If an object number is not registered, a corresponding object number cell is empty. For example, "0214" is registered as an object number for a pixel located at an X coordinate "1223" and a Y coordinate "0905". An object number is not registered for a pixel located at an X coordinate "1970" and a Y coordinate "1110", and an object number cell corresponding to the pixel is empty.

If the object number of the characteristic point B is registered in the object number DB (Yes in S205), the characteristic point B is already registered as a point partially forming another object and the process proceeds to S210. On the other hand, if the object number of the characteristic point B is not registered in the object number DB (No in S205), the object candidate extractor 15 determines whether or not a characteristic point located in the same row as the characteristic point A and able to be coupled to the characteristic point B or a characteristic point C adjacent to the characteristic point B exists (in S206). If the object candidate extractor 15 determines that the characteristic point C able to be coupled to the characteristic point B exists (Yes in S206), the object candidate extractor 15 determines whether or not the characteristic point C is more appropriate as a characteristic point to be coupled to the characteristic point B than the characteristic point A (in S207). In S207, the object candidate extractor 15 makes the determination by comparing an angle between a line obtained by coupling the characteristic point C to the characteristic point B and another line terminated at the characteristic point C with an angle between a line obtained by coupling the characteristic point A to the characteristic point B and another line terminated at the characteristic point A. A method of the comparison is the same as the comparison method used in S204. If the object candidate extractor 15 determines that the characteristic point C is more appropriate than the characteristic point A (Yes in S207), the object candidate extractor 15 updates information indicating the characteristic points C and B and stored in the object number DB while assuming that the characteristic point C will be coupled to the characteristic point B (in S208). Specifically, if an object number of the characteristic point C is registered, the object candidate extractor 15 assigns the same object number as the characteristic point C to the characteristic point B and registers the object number in the object number DB. On the other hand, if the object number of the characteristic point C is not registered, the object candidate extractor 15 assigns a new object number to the characteristic points C and B and registers the new object number in the object number DB. After the process of S208, the process proceeds to S210.

If the object candidate extractor 15 determines that the characteristic point C that is able to be coupled to the characteristic point B does not exist (No in S206) or the object candidate extractor 15 determines that the characteristic point A is more appropriate than the characteristic point C (No in S207), the object candidate extractor 15 updates information indicating the characteristic points A and B and stored in the object number DB while assuming that the characteristic point A will be coupled to the characteristic point B (in S209). Specifically, an object number is yet to be registered for the characteristic point A in the object number DB, and the object candidate extractor 15 newly assigns the same object number to the characteristic points A and B and registers the object number in the object number DB. After the process of S209, the process proceeds to S210.

In S210, the object candidate extractor 15 determines whether or not all the characteristic points extracted by the characteristic point extractor 14 are already selected. If the object candidate extractor 15 determines that at least any of all the characteristic points extracted by the characteristic point extractor 14 is not selected (No in S210), the process returns to S201 and the object candidate extractor 15 executes the processes of S201 and later.

If the object candidate extractor 15 determines that all the characteristic points are already selected (Yes in S210), the object candidate extractor 15 extracts an object candidate based on object numbers (in S211). In S211, the object candidate extractor 15 references the object numbers registered in the object number DB, for example. Then, the object candidate extractor 15 extracts, as the object candidate, a line of which the number of coupled characteristic points is equal to or larger than a predetermined threshold, from among lines generated by coupling characteristic points whose registered object numbers are the same. The predetermined threshold is 10, for example. After the process of S211, the process of S103 is terminated and the process proceeds to S104.

In the aforementioned manner, the object candidate extractor 15 executes the process of extracting one or more object candidates.

Figure 7:
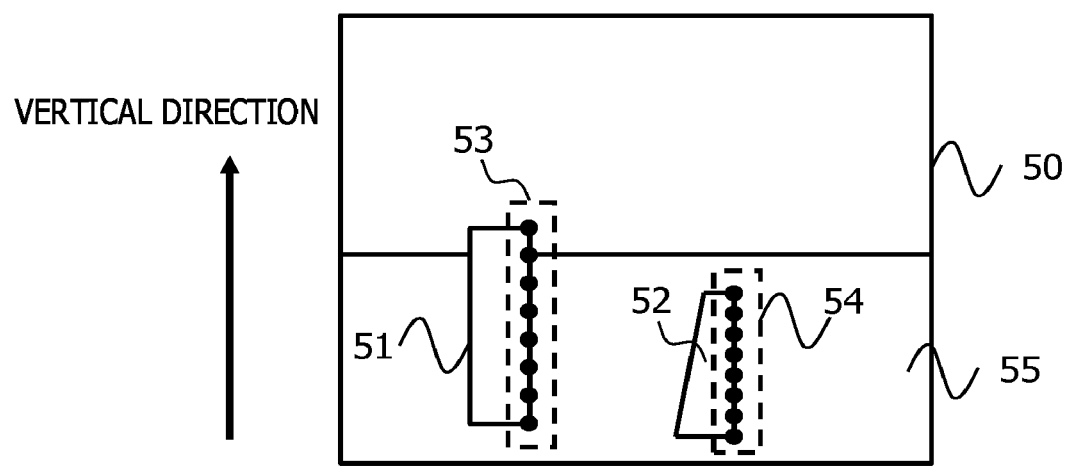
FIG. 7 is a diagram illustrating an example of the extracted object candidates.

FIG. 7 is a diagram illustrating an example of the extracted object candidates. FIG. 7 illustrates an example in which the aforementioned threshold is 8. As illustrated in FIG. 7, an image 50 includes images of object candidates 51 and 52 on a road surface 55. In a frame 53 indicated by a dotted line on the right side of the object candidate 51, multiple characteristic points depicted along a contour of the cubic object 51 exist. In a frame 54 indicated by a dotted line on the right side of the object candidate 52, multiple characteristic points depicted along a contour of the object candidate 52 exist. In the example illustrated in FIG. 7, the two object candidates 51 and 52 are extracted from the image 50 by the process of S103.

Return to FIG. 3. After the process of S103, the observation flow amount calculator 16 calculates observation flow amounts for the characteristic points forming the object candidates extracted in S103 (in S104). The observation flow amounts are the amounts of positional shifts of the characteristic points on the images acquired at the two times, as described above. The observation flow amounts are described below.

Figure 8:
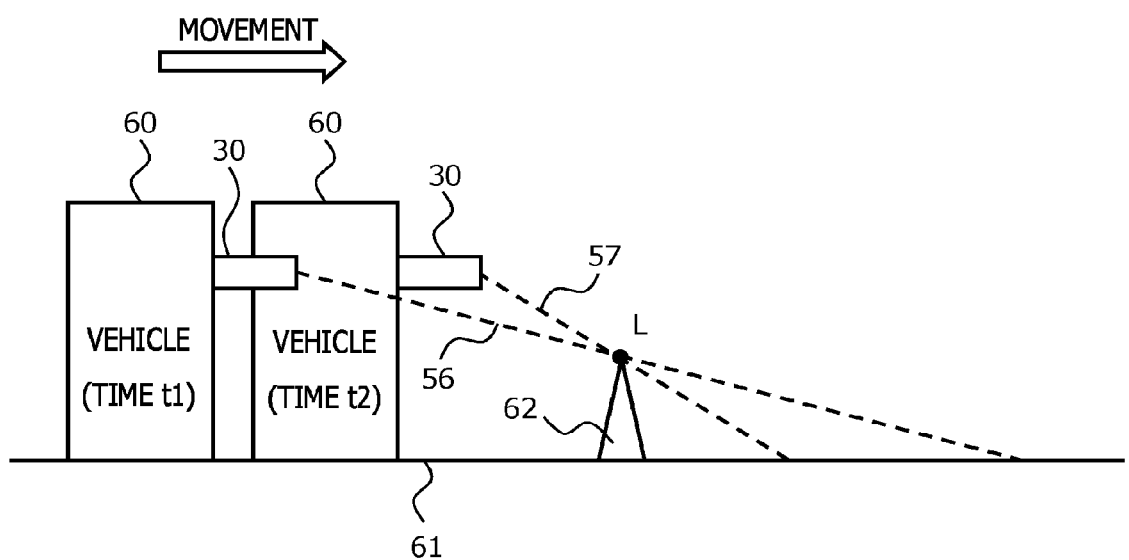
FIG. 8 is a diagram describing observation flow amounts.

FIG. 8 is a diagram describing the observation flow amounts. A cubic object 62 is located on a road surface 61 and an upper end of the cubic object 62 is indicated by L. A line of sight of the camera 30 attached to a vehicle 60 that is directed to the point L at the time t1 is indicated by a line 56. When the vehicle 60 moves and the current time is the time t2, the line of sight of the camera 30 that is directed to the point L changes from the line 56 to a line 57. The change in the line of sight of the camera 30 causes positional shifts of the characteristic points on the images acquired by the camera 30, and the amounts of the positional shifts are observed as observation flow amounts.

A process of calculating the observation flow amounts is described below.

Figure 9:
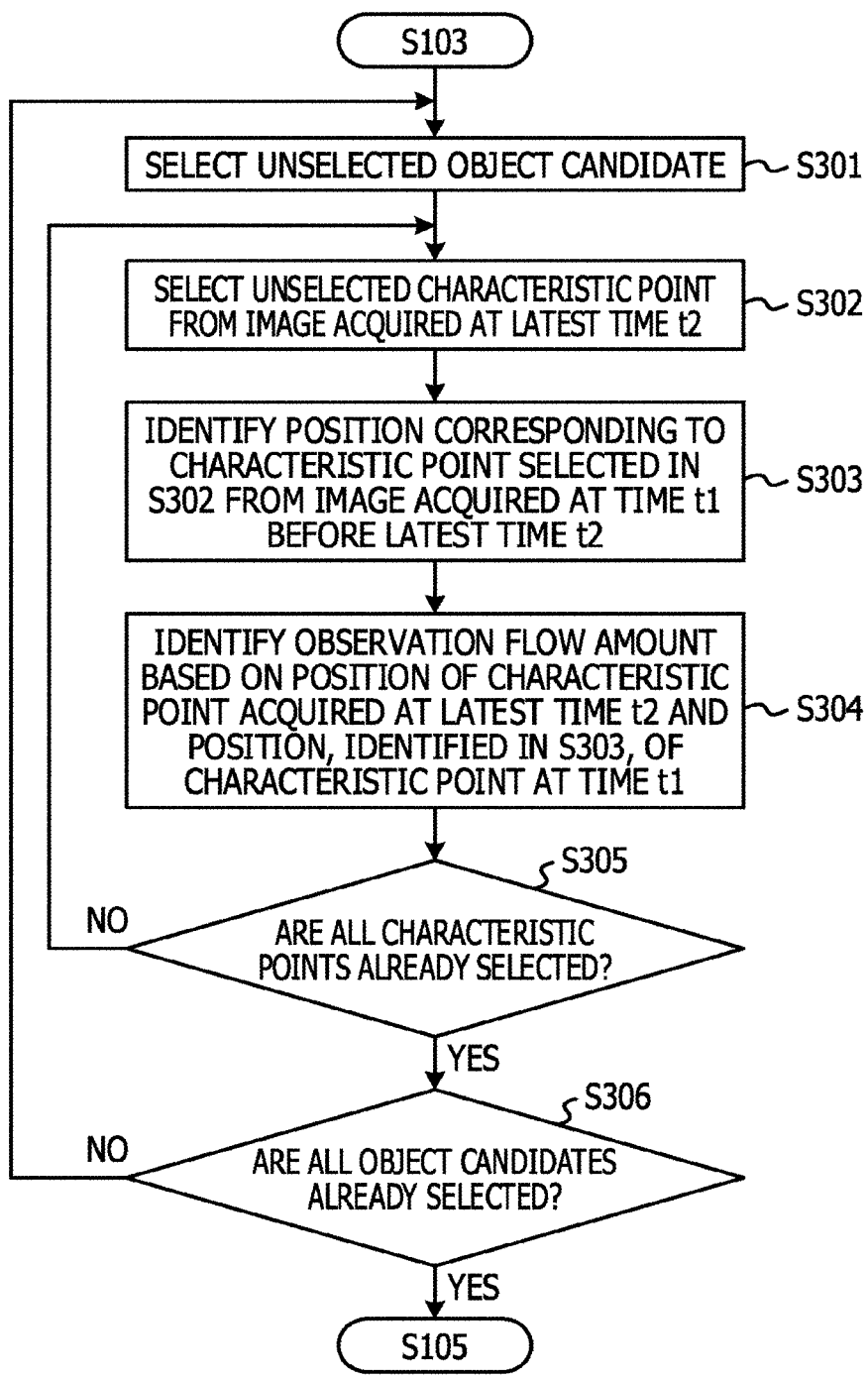
FIG. 9 is a flowchart of an example of a method of calculating the observation flow amounts according to the first embodiment.

FIG. 9 is a flowchart of an example of a method of calculating the observation flow amounts according to the first embodiment.

First, the observation flow amount calculator 16 selects an unselected object candidate from among all the object candidates extracted in S103 (in S301).

Subsequently, the observation flow amount calculator 16 selects an unselected characteristic point of the object candidate selected in S301 from the image acquired at the latest time t2 (in S302).

Then, the observation flow amount calculator 16 reads, from the chronological image DB 13, information of the image acquired at the time t1 before the latest time t2 and identifies the position of a characteristic point that has the highest degree of matching with the characteristic point selected in S302 (in S303). Specifically, the observation flow amount calculator 16 treats, as a template, an image depicting a region located around the characteristic point acquired at the latest time t2 and executes matching of the template with the image acquired at the time t1 before the latest time t2. As a method of the matching, a method of identifying the position of the characteristic point having the highest matching degree by executing general template matching using a similarity index such as a sum of absolute differences (SAD) or a sum of squared differences (SSD) may be used.

Then, the observation flow amount calculator 16 calculates an observation flow amount based on the position of the characteristic point at the latest time t2 and the position, identified in S303, of the characteristic point at the time t1 (in S304).

Then, the observation flow amount calculator 16 determines whether or not all characteristic points that form the object candidate selected in S301 are already selected (in S305). If the observation flow amount calculator 16 determines that at least any of all the characteristic points is not selected (No in S305), the process returns to S302 and the observation flow amount calculator 16 executes the processes of S302 and later. On the other hand, if all the characteristic points are already selected (Yes in S305), the observation flow amount calculator 16 determines whether or not all the object candidates are already selected (in S306).

If at least any of all the object candidates is not selected (No in S306), the process returns to S301 and the observation flow amount calculator 16 executes the processes of S301 and later. On the other hand, if all the object candidates are already selected (Yes in S306), the observation flow amount calculator 16 terminates the process of S104, and the process proceeds to S105. In the aforementioned manner, the observation flow amount calculator 16 executes the process of calculating the observation flow amounts.

Return to FIG. 3. After the process of S104, the virtual road surface flow amount calculator 18 calculates virtual road surface flow amounts that are the amounts of positional shifts of the characteristic points between the two times while assuming that the characteristic points are located on a road surface (in S105).

Figure 10:
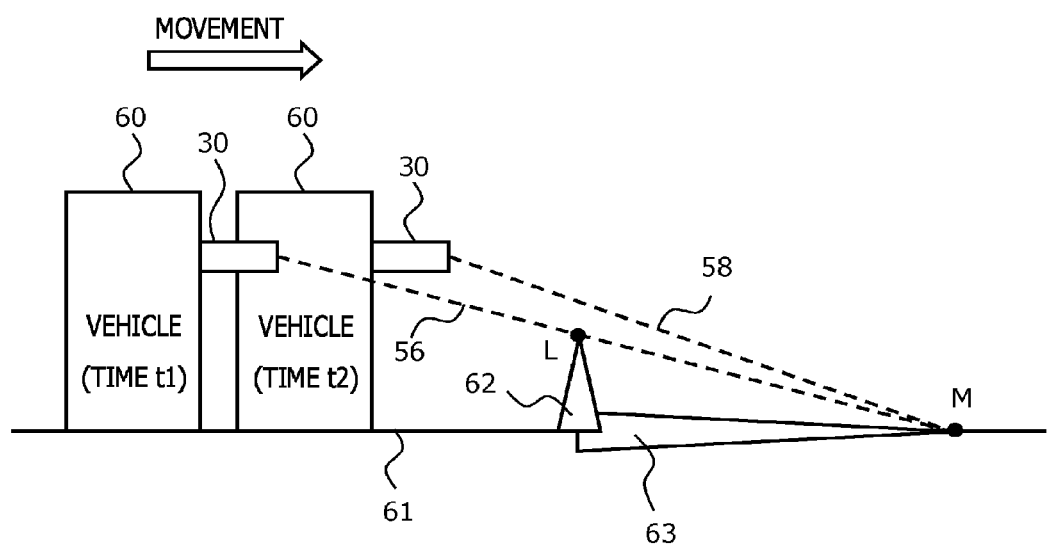
FIG. 10 is a diagram describing virtual road surface flow amounts.

FIG. 10 is a diagram describing the virtual road surface flow amounts. The cubic object 62 is located on the road surface 61 and the upper end of the cubic object 62 is indicated by L. The line of sight of the camera 30 attached to the vehicle 60 that is directed to the point L at the time t1 is indicated by the line 56. A point at which the line 56 that passes through the point L intersects with the road surface 61 is indicated by M. If the point L is assumed to be located on the road surface, the cubic object 62 is assumed to be a road surface pattern 63 and the upper end of the cubic object 62 viewed from the position of the camera 30 at the time t1 is assumed to be located at the position of the point M that is an edge of the road surface pattern 63. When the vehicle 60 moves and the current time is the time t2, the line of sight of the camera 30 that is directed to the point M changes from the line 56 to a line 58. The change in the line of sight of the camera 30 causes positional shifts of the characteristic points on the images, and the amounts of the positional shifts are observed as the virtual road surface flow amounts.

A process of calculating the virtual road surface flow amounts is described below.

Figure 11:
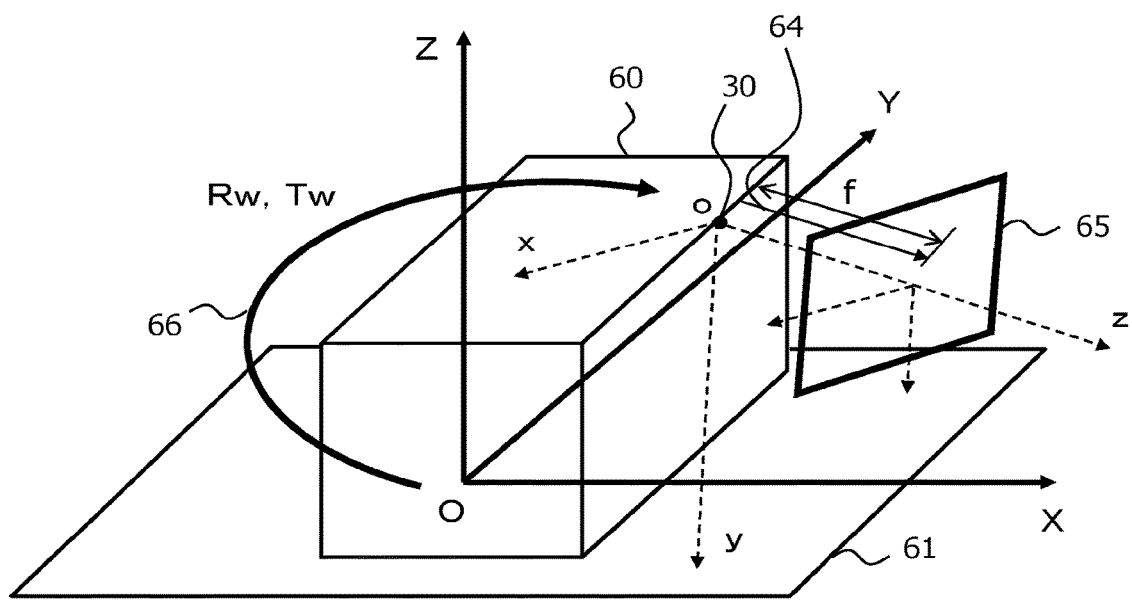
FIG. 11 is a diagram describing a moving object coordinate system and a camera coordinate system.

FIG. 11 is a diagram describing a moving object coordinate system and a camera coordinate system. As illustrated in FIG. 11, a case where the camera 30 is fixed to the vehicle 60 serving as the moving object and the vehicle 60 travels on the road surface 61 is described as an example. In this case, an orthogonal coordinate system O-XYZ, in which a point at which a normal to the road surface 61 from a certain point of the vehicle 60 intersects with the road surface 61 is an origin O, a direction perpendicular to the road surface 61 is defined as Z axis, a direction in which the vehicle 60 travels is defined as Y axis, and a direction perpendicular to Z axis and Y axis is defined as X axis, is referred to as the moving object coordinate system. The certain point of the vehicle 60 may be the center of gravity of the vehicle 60, a center on a cross section, parallel to the road surface, of the vehicle 60, or the like, for example.

An orthogonal coordinate system o-xyz in which a predetermined position (for example, the central point of an objective lens of the camera 30) of the camera 30 attached to the vehicle 60 is an origin o and an optical axis is z axis is referred to as the camera coordinate system. The position of the aforementioned origin o is referred to as a camera position in some cases. In the camera coordinate system, a surface that is perpendicular to z axis and separated by a focal distance f of the camera from the camera position as indicated by an arrow 64 is referred to as an imaging surface 65.

An arrow 66 indicates transformation between the moving object coordinate system and the camera coordinate system. As indicated by the arrow 66, the transformation between the moving object coordinate system and the camera coordinate system is expressed by a rotation matrix Rw and a translation vector Tw in the moving object coordinate system. The rotation matrix Rw is a matrix of 3 columns and 3 rows that is expressed by using angles between the axes of the moving object coordinate system and the axes of the camera coordinate system, for example. The translation vector Tw is a matrix of 3 columns and 1 row that expresses a relative position of the origin of the camera coordinate system to the origin of the moving object coordinate system. The rotation matrix Rw and the translation vector Tw are information acquired by the motion amount detector 17 illustrated in FIG. 1.

The amount (Rw, Tw) of a movement of the vehicle 60 that is expressed by the rotation matrix Rw and the translation vector Tw is described in the moving object coordinate system. A positional vector of a three-dimensional position corresponding to a characteristic point and expressed in the moving object coordinate system at the time t1 that is before the latest time t2 and among the times when the images are acquired is indicated by Xw1, while a positional vector of a three-dimensional position corresponding to a characteristic point and expressed in the moving object coordinate system at the latest time t2 is indicated by Xw2. In addition, positional vectors of three-dimensional positions corresponding to the two characteristic points and expressed in the camera coordinate system are indicated by xh1 and xh2, respectively. The amount of a movement of the moving object from the time t1 to the time t2 is expressed by a rotation matrix Rm and a translation vector Tm.

The transformation from the moving object coordinate system Xw (X, Y, Z) to the camera coordinate system xh (x, y, z) is expressed using the rotation matrix Rw and the translation vector Tw as follows, where "*" indicates multiplication.

$$xh = Rw * (Xw - Tw) \quad \text{(Equation 1)}$$

Equation 1 may be modified to the following Equation 2.

$$Xw = Rw^T * xh + Tw \quad \text{(Equation 2)}$$

$Rw^T$ is a transposed matrix of Rw.

Figure 12:
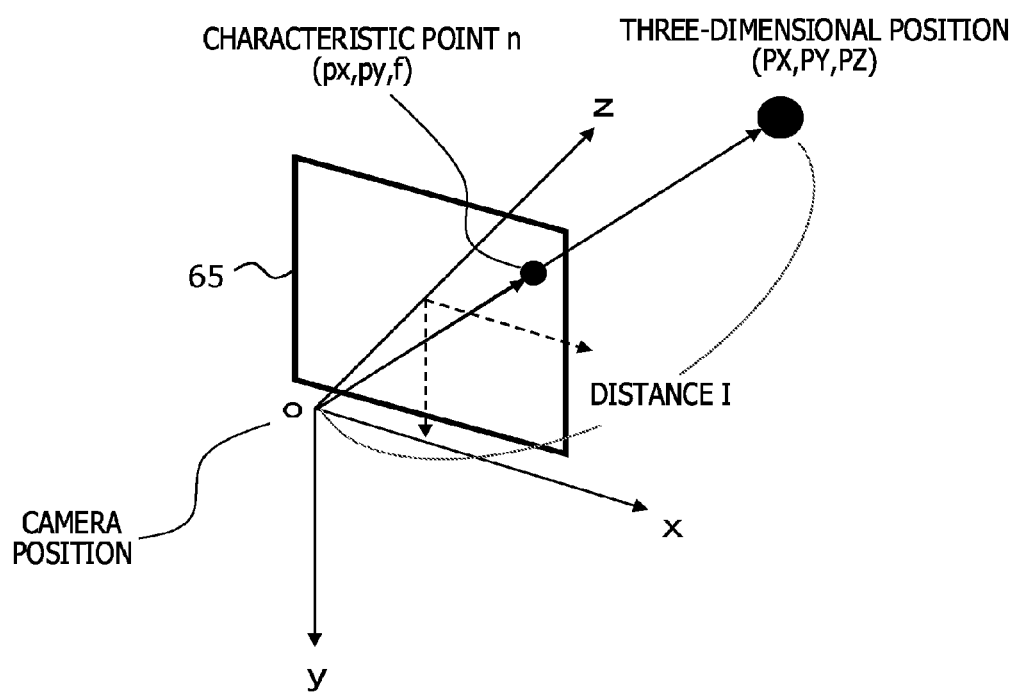
FIG. 12 is a diagram illustrating a relationship between a characteristic point and a three-dimensional position in the camera coordinate system.

FIG. 12 is a diagram illustrating a relationship between the position of a characteristic point and a three-dimensional position in the camera coordinate system. A focal distance of the camera is f. As illustrated in FIG. 12, the characteristic point n at an arbitrary time is on the imaging surface 65, and the following coordinates exist in the camera coordinate system xh in which the camera position is the origin o. Specifically, the position of the characteristic point n on the imaging surface 65 is expressed by a positional vector using the camera position as a standard.

$$n = (px, py, f) \quad \text{(Equation 3)}$$

In this case, a point on a line extending from the positional vector of the characteristic point n is located at the three-dimensional position of an actual object candidate. The three-dimensional position is indicated by P, a distance from the camera position to the position P is indicated by l, and the positional vector (coordinates) of P in the camera coordinate system xh is expressed by the following Equation 4.

$$P = I*n = (I*px, I*py, I*f) \quad \text{(Equation 4)}$$

Then, coordinates of P in the camera coordinate system xh is transformed to coordinates in the moving object coordinate system Xw (X, Y, Z). In this case, since the height of the road surface is zero or Z=0, the distance I satisfying Z=0 may be calculated using Equations 1 and 4. Then, the remaining X and Y may be calculated using the calculated distance I.

Then, the relationship between the coordinate Xw1 at the time t1 and the coordinate Xw2 at the time t2 in the moving object coordinate system Xw is expressed using the rotation matrix Rw and translation vector Tw of the moving object.

$$Xw2 = Rw*Xw1*Tw \quad \text{(Equation 5)}$$

The coordinate xh1 at the time t1 in the camera coordinate system xh is expressed as follows.

$$xh1 = Rw*(Xw1-Tw) \quad \text{(Equation 6)}$$

The coordinate xh2 at the time t2 in the camera coordinate system xh is expressed as follows.

$$xh2 = Rw*(Xw2-Tw) \quad \text{(Equation 7)}$$

If the coordinate xh1 is known, the coordinate xh1 may be transformed to the coordinate Xw1 in the moving object coordinate system Xw by substituting the coordinate xh1 and the rotation matrix Rw and translation vector Tw of the moving object into Equation 6. After the coordinate system Xw1 is calculated, the coordinate Xw2 may be calculated by substituting the coordinate Xw1 and the rotation matrix Rw and translation vector Tw of the moving object into Equation 5. In addition, after the coordinate Xw2 is calculated, the coordinate xh2 may be calculated by substituting the coordinate Xw2 and the rotation matrix Rw and translation vector Tw of the moving object into Equation 7.

The coordinate Xh1 indicates the position (x1, y1) of the characteristic point on the image acquired at the time t1 in a case where the characteristic point is assumed to be on the road surface. The coordinate xh2 indicates the position (x2, y2) of the characteristic point on the image acquired at the time t2 in a case where the characteristic point is assumed to be on the road surface. Thus, the virtual road surface flow amount calculator 18 may calculate the virtual road surface flow amounts by the following Formula 8 for calculating a distance between coordinates.

$$\text{sqrt}((x2-x1)^2+(y2-y1)^2) \quad \text{(Formula 8)}$$

A symbol sqrt(A) indicates the square root of A. In the aforementioned manner, the virtual road surface flow amount calculator 18 executes the process of calculating the virtual road surface flow amounts.

As illustrated in FIG. 10, the parallax of the cubic object 62 viewed by the camera 30 at the two times is larger than the parallax of the road surface pattern 63 viewed by the camera 30 at the two times. Thus, if a certain characteristic point on the screen is included in the cubic object 62, a motion of the certain characteristic point between the two times is larger than a motion of the characteristic point assumed to be on a road surface pattern between the two times and an observation flow amount of the certain characteristic point is larger than a road surface flow amount of the certain characteristic point. If a certain characteristic point on the screen is on the road surface pattern 63, an observation flow amount of the certain characteristic point is equal to a virtual road surface flow amount of the certain characteristic point. Thus, whether an object candidate is a cubic object or a road surface pattern may be identified by checking differences between observation flow amounts and virtual road surface flow amounts. Hereinafter, the difference between an observation flow amount and a virtual road surface flow amount is referred to as a flow difference. The flow difference is an index indicating a relative value of the amount of a positional shift of an object included in images acquired at the two times to the amount of a positional shift of a road surface included in the images acquired at two times. A distribution of flow differences in a vertical direction (referred to as y axis direction in some cases) on the screen is referred to as a flow difference distribution.

Return to FIG. 3. After the process of S105, the flow difference distribution generator 19 uses the observation flow amounts calculated in S104 and the virtual road surface flow amounts calculated in S105 to generate flow difference distributions of the object candidates (in S106). A process of generating the flow difference distributions is described below.

Figure 13:
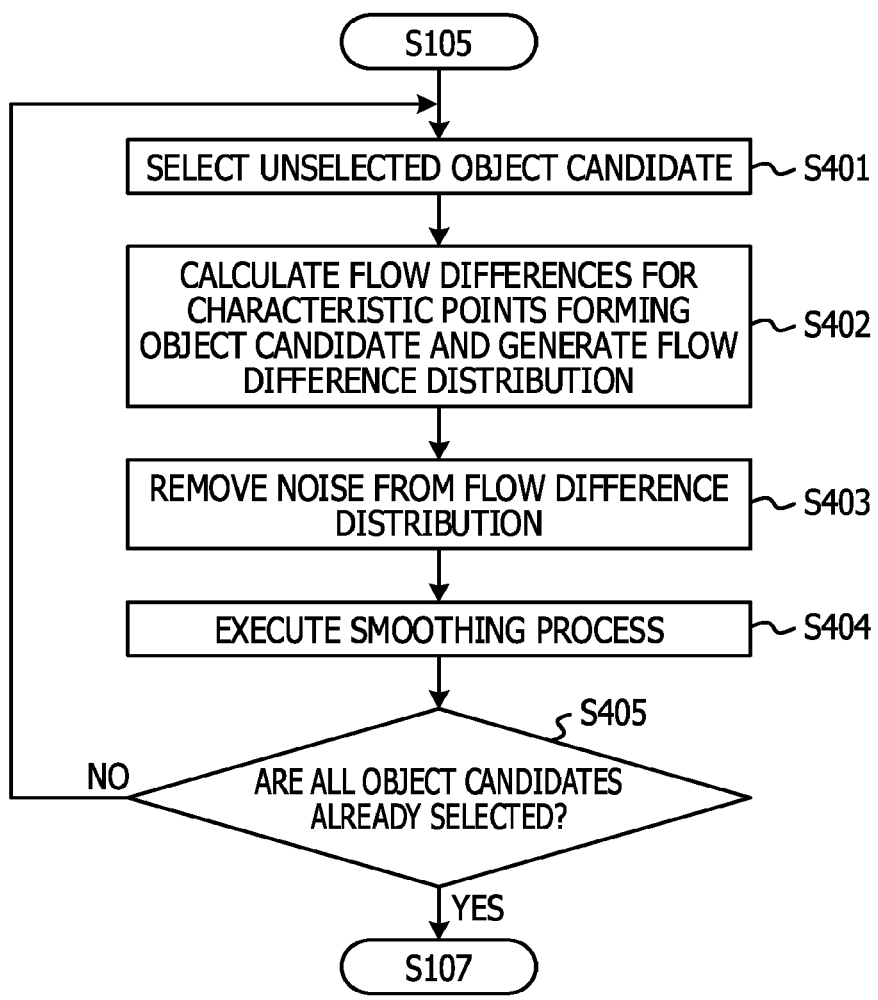
FIG. 13 is a flowchart of an example of a process of generating flow difference distributions according to the first embodiment.

FIG. 13 is a flowchart of an example of the process of generating the flow difference distributions.

First, the flow difference distribution generator 19 selects an unselected object candidate from among all the object candidates extracted in S103 (in S401).

Then, the flow difference distribution generator 19 calculates flow differences for characteristic points forming the object candidate and generates a flow difference distribution (in S402). Specifically, the flow difference distribution generator 19 calculates a flow difference for a certain characteristic point by calculating the difference between an observation flow amount calculated for the certain characteristic point in S104 and a virtual road surface flow amount calculated for the certain characteristic point in S105. By executing the calculation process on each of the characteristic points, the distribution of the flow differences for the height of the object candidate from the road surface is generated.

Then, the flow difference distribution generator 19 removes noise from the flow difference distribution based on the continuity of the flow difference distribution (in S403). Specifically, the flow difference distribution generator 19 calculates a moving average of the flow differences. After that, the flow difference distribution generator 19 removes the noise by removing parts at which the differences between the moving average and the flow differences are equal to or larger than a predetermined threshold.

Then, the flow difference distribution generator 19 executes a smoothing process on the flow difference distribution from which the noise was removed (in S404). Specifically, the flow difference distribution generator 19 recalculates the moving average of the flow differences from which the noise was removed. After that, the flow difference distribution generator 19 executes the smoothing process by using a threshold smaller than the threshold set in S403 to remove parts at which the differences between the moving average and the flow differences are larger than the smaller threshold. S403 and S404 may be executed as the same step. The process of S404 may be omitted depending on the continuity of the flow difference distribution generated in S402.

Then, the flow difference distribution generator 19 determines whether or not all the object candidates are already selected (in S405). If the flow difference distribution generator 19 determines that at least any of all the object candidates is not selected (No in S405), the process returns to S401 and the flow difference distribution generator 19 executes the processes of S401 and later. On the other hand, if the flow difference distribution generator 19 determines that all the object candidates are already selected (Yes in S405), the process of S106 is terminated and the process proceeds to S107. In the aforementioned manner, the flow difference distribution generator 19 executes the process of generating the flow difference distributions.

Return to FIG. 3. After the process of S106, the model matching unit 20 compares each of the flow difference distributions generated in S106 with multiple flow difference distribution models and determines flow difference distribution models corresponding to the object candidates (in S107). This process is referred to as a model matching process. The model matching process is described below.

Figure 14:
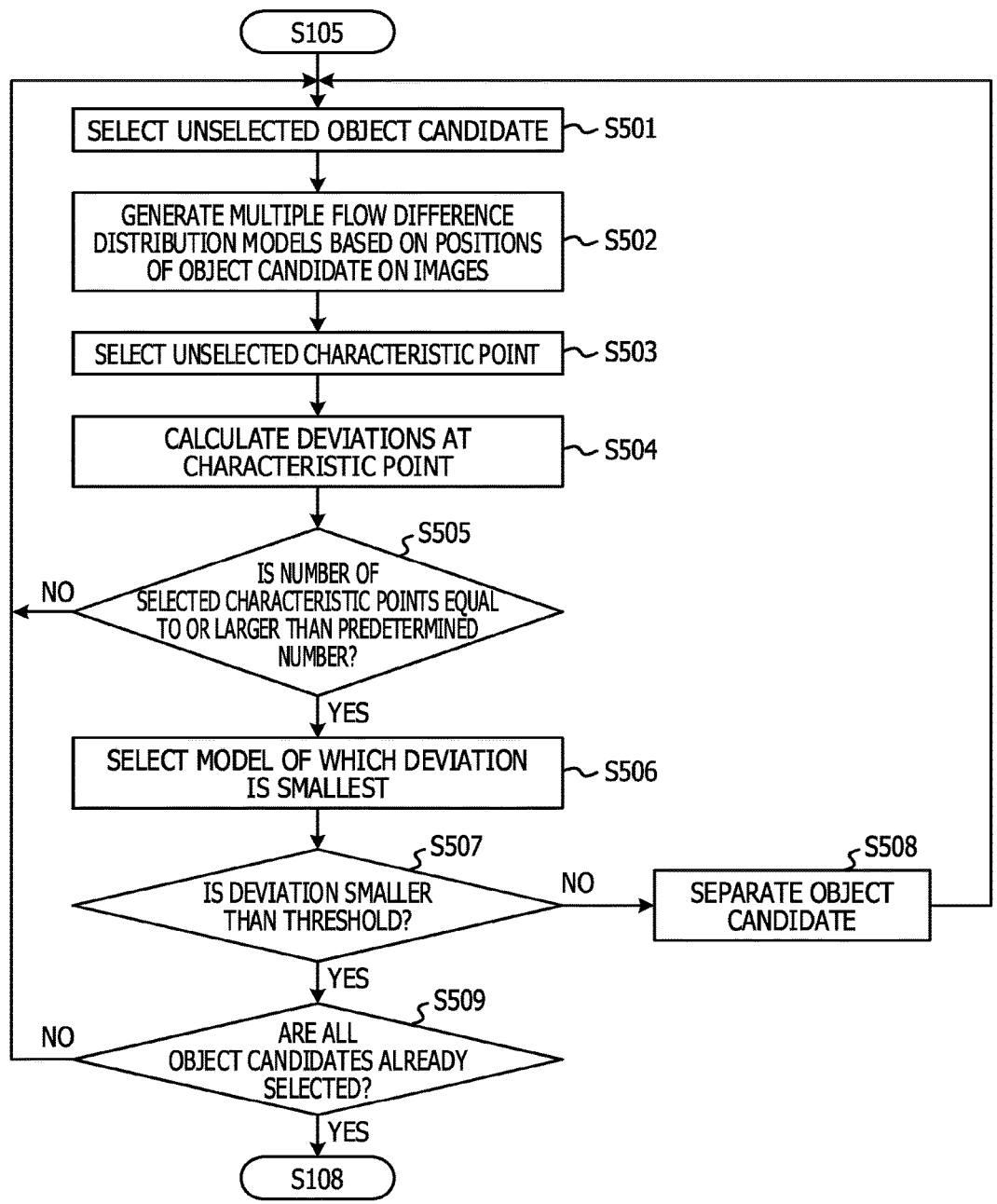
FIG. 14 is a flowchart of an example of a model matching process.

FIG. 14 is a flowchart of an example of the model matching process.

First, the model matching unit 20 selects an unselected object candidate from among all the object candidates extracted in S103 (in S501). Then, the model matching unit 20 generates multiple flow difference distribution models for combinations of the object candidate types and the road surface's inclined state types based on the positions of the object candidate on the images (in S502). A method of generating the flow difference distribution models is described below.

First, the model matching unit 20 extracts a coordinate xh2 of a characteristic point of the object candidate in the camera coordinate system xh from the imaging surface at the latest time t2. After that, the model matching unit 20 transforms the coordinate xh2 to a coordinate Xw2 in the moving object coordinate system Xw by substituting the extracted coordinate xh2 and the rotation matrix Rw and translation vector Tw, acquired by the motion amount detector 17 illustrated in FIG. 1, of the moving object into Equation 7.

Then, the model matching unit 20 calculates a coordinate Xw1 at the time t1 by substituting the calculated coordinate Xw2, the rotation matrix Rw, and the translation vector Tw into Equation 5.

Then, the model matching unit 20 transforms the coordinate Xw1 to a coordinate xh1 in the camera coordinate system xh by substituting the calculated coordinate Xw1, the rotation matrix Rw, and the translation vector Tw into Equation 6.

After that, the model matching unit 20 calculates a flow amount of the characteristic point by calculating the difference between the coordinate xh1 and the coordinate xh2. Lastly, the model matching unit 20 calculates a flow difference of the characteristic point by calculating the difference between the calculated flow amount and a virtual road surface flow amount calculated for the characteristic point in S105.

The aforementioned process is executed on each of the characteristic points of the object candidate. Thus, the model matching unit 20 may generate a flow difference distribution model that is a model of relationships between the height of the object candidate and flow differences of the characteristic points of the object candidate. This model is hereinafter referred to as a flow difference distribution model. In the first embodiment, multiple flow difference distribution models are generated for combinations of the object candidate types (cubic object and road surface pattern) and the road surface's inclined state types (flat road surface, ascending slope, and descending slope) by using Equations 5, 6, and 7 for corrections based on angles of slopes. The corrections of the equations are executed by a method of correcting coordinate values with a coefficient or correction item based on the angles of the slopes using known mathematics (geometry).

Figure 15A:
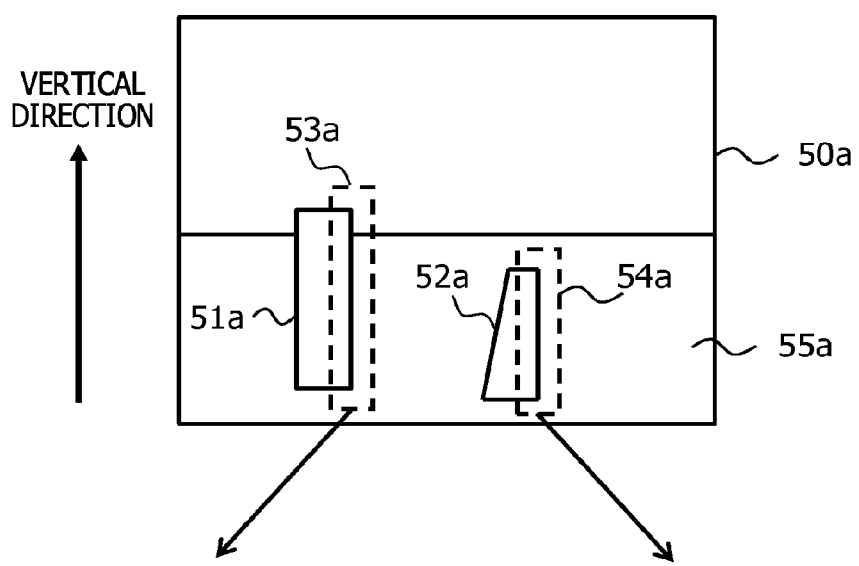
FIGS. 15A, 15B, and 15C are diagrams illustrating an example of flow difference distribution models for a flat road surface.
Figure 15B:
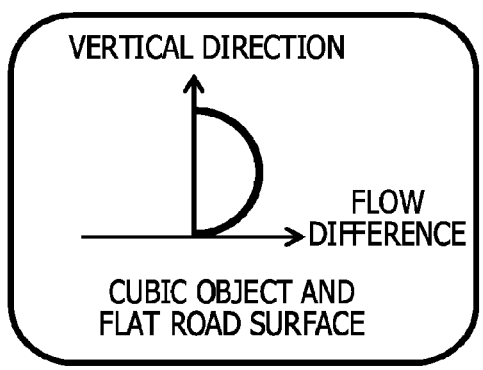
Figure 15C:
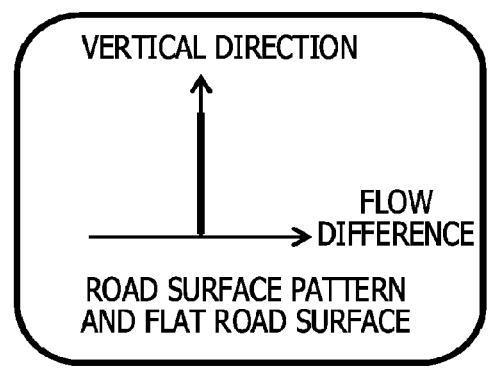
Figure 16:
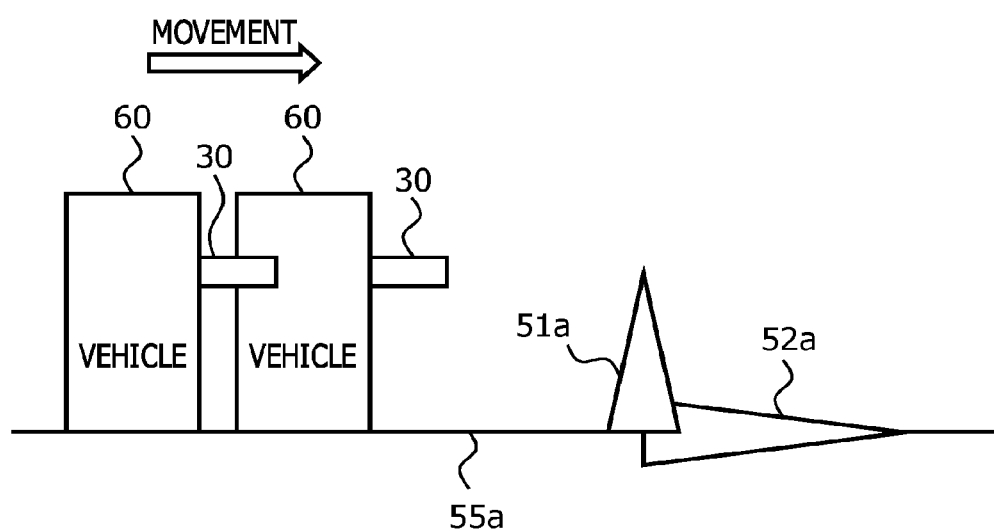
FIG. 16 is a diagram illustrating an example of the flat road surface.

FIGS. 15A, 15B, and 15C are diagrams illustrating an example of flow difference distribution models for a flat road surface. FIG. 16 is a diagram illustrating an example of the flat road surface.

FIG. 15A illustrates an example of an image of the flat surface. An image 50a includes images of a cubic object 51a and a road surface pattern 52a that are located on a road surface 55a. Multiple characteristic points exist along a contour of the cubic object 51a in a frame 53a indicated by a dotted line on the right side of the cubic object 51a, but are omitted in FIG. 15A. Multiple characteristic points exist along a contour of the road surface pattern 52a in a frame 54a indicated by a dotted line on the right side of the road surface pattern 52a, but are omitted in FIG. 15A.

FIG. 15B illustrates an example of a flow difference distribution model for the cubic object on the flat road surface. This flow difference distribution model is generated based on the multiple characteristic points within the frame 53a. As illustrated in FIG. 16, the flow difference distribution model is an example in a case where the height of an upper end of the cubic object 51a from the road surface 55a is equal to the height of the camera 30 from the road surface 55a. If the height of the upper end of the cubic object 51a from the road surface 55a is equal to the height of the camera 30 from the road surface 55a, and the vehicle 60 moves toward the cubic object 51a, the position of a characteristic point of the upper end of the cubic object 51a does not change. Thus, an observation flow amount of the characteristic point is zero. If the upper end of the cubic object is assumed to be located on the road surface, the line of sight of the camera 30 that extends to the upper end of the cubic object 51a is parallel to the road surface 55a. Thus, even if the vehicle 60 moves toward the cubic object 51a, a point that corresponds to the upper end of the cubic object 51a and is on the road surface does not exist. Thus, a virtual road surface flow amount that corresponds to the characteristic point of the upper end of the cubic object 51a may be treated as zero. Thus, a flow difference that is the difference between the observation flow amount and the virtual road surface flow amount is calculated to be zero.

A lower end of the cubic object 51a is located on the road surface 55a, as illustrated in FIG. 16. Thus, an observation flow amount of a characteristic point of the lower end of the cubic object 51a when the moving object moves toward the cubic object 51a is equal to a virtual road surface flow amount of the characteristic point of the lower end of the cubic object 51a in a case where the lower end of the cubic object 51a is assumed to be located on the road surface 55a. Thus, a flow difference that is the difference between the observation flow amount and the virtual road surface flow amount is calculated to be zero.

In the aforementioned manner, a flow difference distribution model in which the flow differences of the upper and lower ends of the cubic object 51a are zero and a flow difference of a part located between the upper and lower ends of the cubic object 51a is maximal may be obtained, as illustrated in FIG. 15A. A profile of the flow difference distribution model for the cubic object is not fixed. The profile is generated based on the position, size, and shape of the cubic object or a positional relationship between the cubic object and the camera 30.

FIG. 15C illustrates an example of a flow difference distribution model for the road surface pattern on the flat surface. This flow difference distribution model is generated based on the multiple characteristic points within the frame 54*a*. All characteristic points that form the road surface pattern 52*a* exist on the road surface 55*a*. Thus, observation flow amounts of all the characteristic points of the road surface pattern 52*a* on the flat road surface 55*a* are equal to virtual road surface flow amounts of all the characteristic points of the road surface pattern 52*a* in a case where the characteristic points are assumed to exist on the road surface. Thus, flow differences that are the differences between the observation flow amounts and the virtual road surface flow amounts are calculated to be zero, regardless of the positions of the characteristic points on the road surface 55*a*.

In the aforementioned manner, the flow difference distribution model in which the flow differences of the points that are on the road surface pattern 52*a* and exist in a range from upper to lower ends of the road surface patterns 52*a* are zero may be obtained, as illustrated in FIG. 15C. If the road surface is flat, the length of the cubic object in the vertical direction varies depending on the size of the cubic object, but is substantially the same in a profile of the flow difference distribution model for the road surface pattern, regardless of the road surface pattern.

Figure 17A:
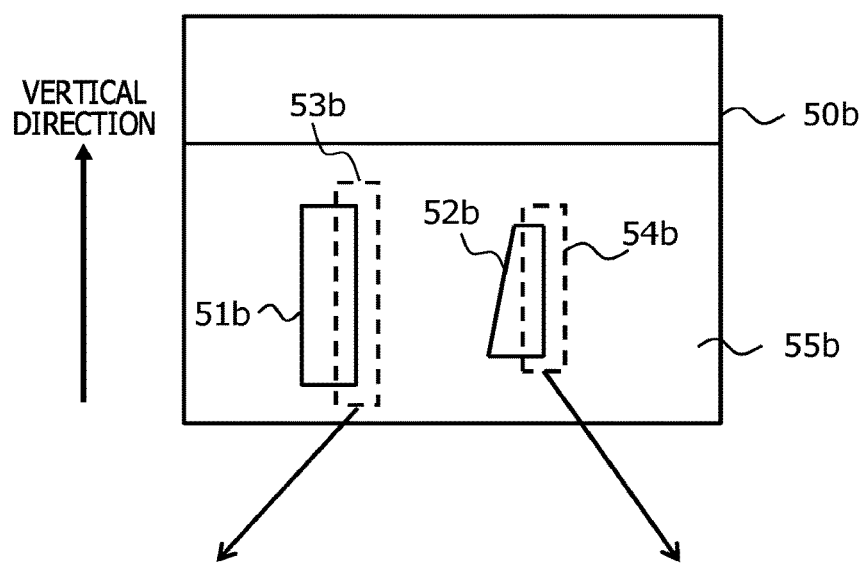
FIGS. 17A, 17B, and 17C are diagrams illustrating an example of flow difference distribution models for a road surface including an ascending slope.
Figure 17B:
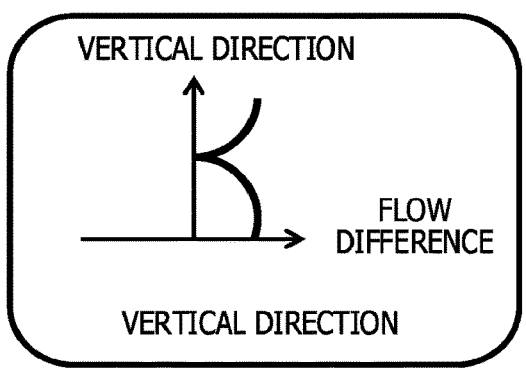
Figure 17C:
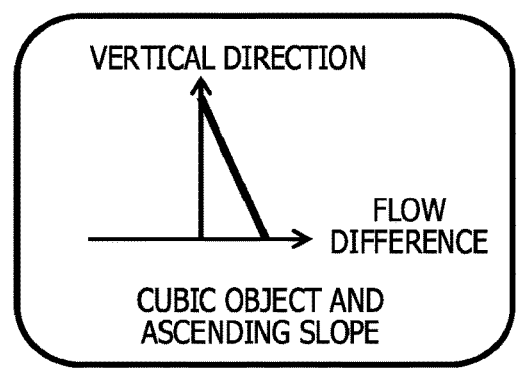
Figure 18:
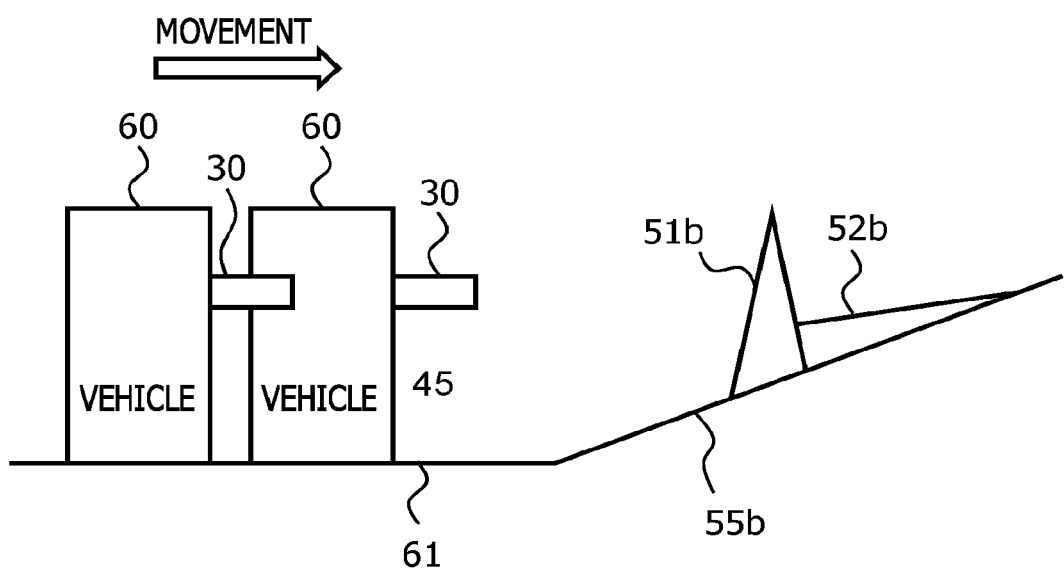
FIG. 18 is a diagram illustrating an example of the road surface including the ascending slope.

FIGS. 17A, 17B, and 17C are diagrams illustrating an example of flow difference distribution models for a road surface including an ascending slope. FIG. 18 is a diagram illustrating an example of the road surface including the ascending slope.

FIG. 17A illustrates an example of an image of the road surface including the ascending slope. An image 50*b* includes images of a cubic object 51*b* and a road surface pattern 52*b* that are located on a road surface 55*b* including an ascending slope. Multiple characteristic points exist along a contour of the cubic object 51*b* in a frame 53*b* indicated by a dotted line on the right side of the cubic object 51*b*, but are omitted in FIG. 17A. Multiple characteristic points exist along a contour of the road surface pattern 52*b* in a frame 54*b* indicated by a dotted line on the right side of the road surface pattern 52*b*, but are omitted in FIG. 17A.

FIG. 17B illustrates an example of a flow difference distribution model for the cubic object on the road surface including the ascending slope. This flow difference distribution model is generated based on the multiple characteristic points within the frame 53*b*.

In a case where the road surface 55*b* includes the ascending slope and the vehicle 60 moves toward the cubic object 51*b*, the positions of characteristic points that are among the multiple characteristic points included in the contour of the cubic object 51*b* and are located at the same vertical position as the camera 30 with respect to the road surface 61 located immediately under the vehicle 60 do not change. Thus, observation flow amounts of the characteristic points are zero.

If the characteristic points located at the same vertical position as the camera 30 and included in the cubic object 51*b* are assumed to be on the road surface and the vehicle 60 moves toward the cubic object 51*b*, points that correspond to the characteristic points and are on the road surface 55*b* do not change. Thus, virtual road surface flow amounts of the characteristic points are zero. Accordingly, flow differences that are the differences between the observation flow amounts and the virtual road surface flow amounts are calculated to be zero.

In the aforementioned manner, a flow difference distribution model in which a point whose flow difference is zero exists between upper and lower ends of the cubic object 51*b* and a flow difference of a point becomes larger as the point is closer to the upper or lower end of the cubic object 51*b* may be obtained, as illustrated in FIG. 17B.

FIG. 17C illustrates an example of a flow difference distribution model for the road surface pattern on the road surface including the ascending slope. This flow difference distribution model is generated based on the multiple characteristic points within the frame 54*b*. This flow difference distribution model is an example in which a characteristic point that is located farthest from the camera 30 among characteristic points of the road surface pattern 52*b* or corresponds to an upper end of the road surface pattern 52*b* included in the image 50*b* is located at the same vertical position as the camera 30, as illustrated in FIG. 18.

In the case where the road surface 55*b* includes the ascending slope, the overall road surface pattern 52*b* is located at a higher position than the road surface 61 located immediately under the vehicle 60, as illustrated in FIG. 18. Specifically, if the road surface 55*b* is flat, the road surface pattern 52*b* is located at such a vertical position that the road surface pattern 52*b* may be identified as a cubic object. A change in the parallax of the upper end of the road surface pattern 52*b* between the two times is zero. In addition, a change in the parallax of a part of the road surface pattern 52*b* is larger as the part is closer to the lower end of the road surface pattern 52*b*. Thus, a flow difference distribution model in which a flow difference of the upper end of the road surface pattern 52*b* is zero and a flow difference of a point becomes larger as the point is closer to the lower end of the road surface pattern 52*b* may be obtained, as illustrated in FIG. 17C.

Figure 19A:
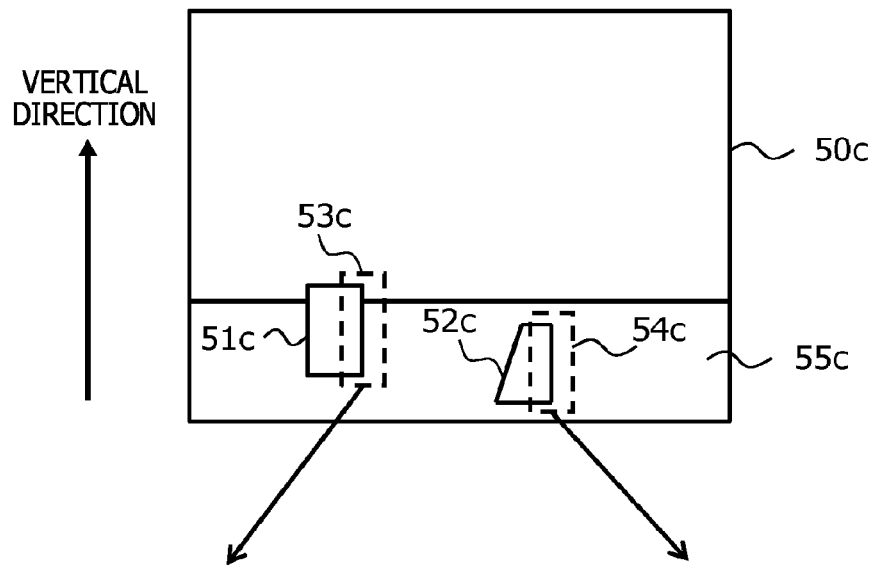
FIGS. 19A, 19B, and 19C are diagrams illustrating an example of flow difference distribution models for a road surface including a descending slope.
Figure 19B:
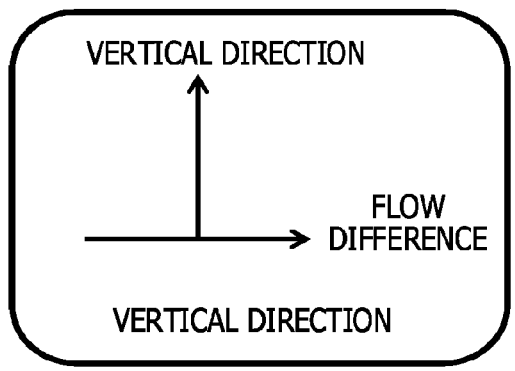
Figure 19C:
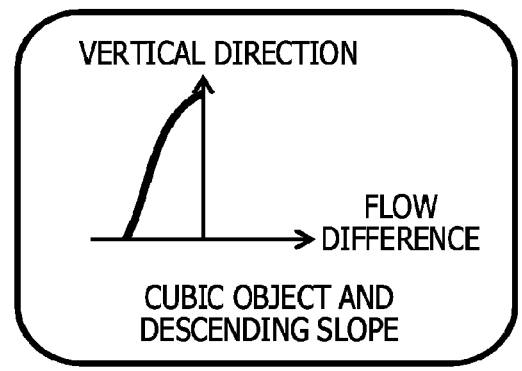
Figure 20:
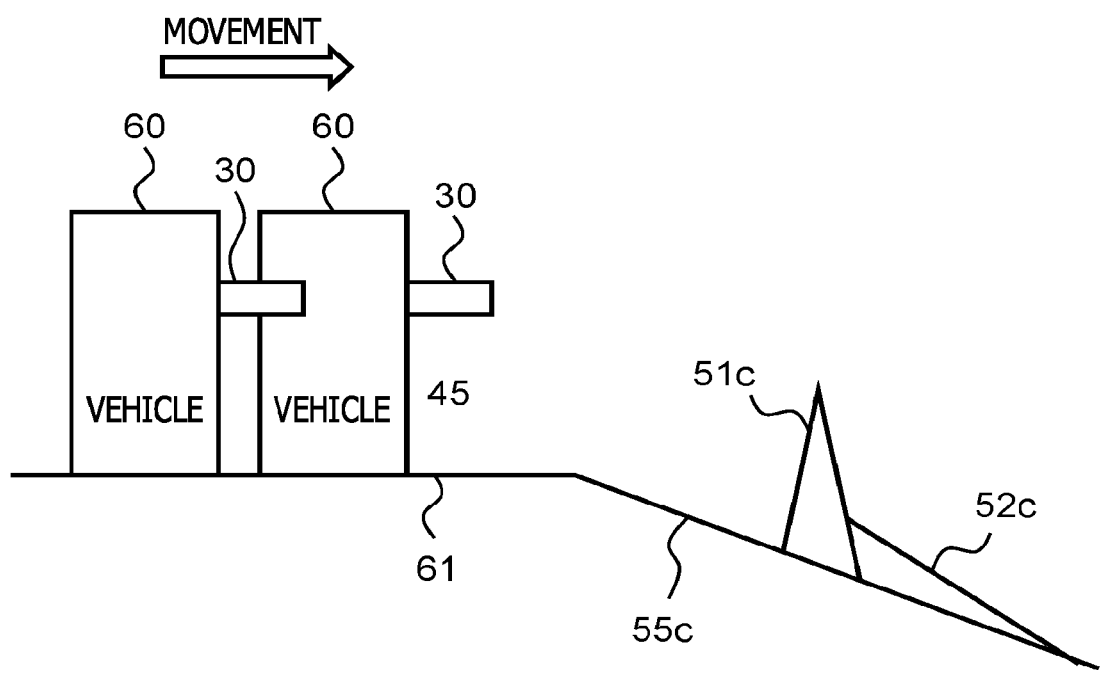
FIG. 20 is a diagram illustrating an example of the road surface including the descending slope.

FIGS. 19A, 19B, and 19C are diagrams illustrating an example of flow difference distribution models for a road surface including a descending slope. FIG. 20 is a diagram illustrating an example of the road surface including the descending slope.

FIG. 19A illustrates an example of an image of the road surface including the descending slope. An image 50*c* includes images of a cubic object 51*c* and a road surface pattern 52*c* that are located on a road surface 55*c* including a descending slope. Multiple characteristic points exist along a contour of the cubic object 51*c* in a frame 53*c* indicated by a dotted line on the right side of the cubic object 51*c*, but are omitted in FIG. 19A. Multiple characteristic points exist along a contour of the road surface pattern 52*c* in a frame 54*c* indicated by a dotted line on the right side of the road surface pattern 52*c*, but are omitted in FIG. 19A.

FIG. 19B illustrates an example of a flow difference distribution model for the cubic object on the road surface including the descending slope. This flow difference distribution model is generated based on the multiple characteristic points within the frame 53*c*.

In the case where the road surface includes the descending slope, a part of the cubic object 51*c* is located lower than the road surface 61 located immediately under the vehicle 60 in the example illustrated in FIG. 20. An upper end of the cubic object 51*c* is located lower than the camera 30. Thus, in the flow difference distribution model, a flow difference of a certain characteristic point located at the same vertical position as the road surface 61 located immediately under the vehicle 60 is zero, as illustrated in FIG. 19B. The following profile is obtained. In the profile, a flow difference of a point located higher than the certain characteristic point and lower than the upper end of the cubic object 51*c* becomes larger and closer to the maximum as the point is closer to the upper end of the cubic object 51*c*, a flow difference of another point located between the certain point and the upper end of the cubic object 51*c* becomes smaller as the other point is located higher, and a flow difference of the upper end of the cubic object 51c is not zero. In addition, in the profile, a flow difference of another point located lower than the certain characteristic point is negative and smaller as the other point is located closer to a lower end of the cubic object 51c.

FIG. 19C illustrates an example of a flow difference distribution model for the road surface pattern on the road surface including the descending slope.

In the case where the road surface 55c includes the descending slope, a change in the parallax of the road surface pattern 52c upon a movement of the vehicle 60 toward the road surface pattern 52c is smaller than that obtained in a case where the road surface pattern 52c is on the flat road surface 61. Virtual road surface flow amounts of characteristic points included in the road surface pattern 52c are flow amounts obtained if the characteristic points included in the road surface pattern 52c are assumed not to exist on the road surface 55c and are assumed to exist on the flat road surface 61. Thus, in the case where the road surface pattern 52c exists on the road surface 55c including the descending slope, the virtual road surface flow amounts are larger than observation flow amounts, and flow differences that are differences between the virtual road surface flow amounts and the observation flow amounts are negative. Thus, as illustrated in FIG. 19C, a flow difference distribution model in which a flow difference of an upper end of the road surface pattern 52c is infinitely close to zero and a flow difference of a point is negative and smaller as the point is closer to a lower end of the road surface pattern 52c is obtained.

In the aforementioned manner, the model matching unit 20 generates multiple flow difference distribution models for the combinations of the road surface's inclined state types and the object candidate types in S502. FIGS. 15A, 15B, 15C, 17A, 17B, 17C, 19A, 19B, and 19C illustrate the flow difference distribution models of the six types for the combinations of the two object candidate types (cubic object and road surface pattern) and the three road surface's inclined state types (flat surface, road surface including the ascending slope, and road surface including the descending slope). However, since inclined states of actual road surfaces infinitely exist, flow difference distribution models are not limited to the six types. In S502, it is preferable that angles of predicted slopes be set and the process be executed based on the set angles.

Return to FIG. 14. After the multiple flow difference distribution models are generated in S502, the model matching unit 20 selects an unselected characteristic point from among characteristic points forming the object candidate (in S503). In S503, it is preferable that the model matching unit 20 select characteristic points from among the characteristic points forming the object candidate in order from a characteristic point that is closest to the road surface or whose y coordinate on the screen is the smallest. For example, it is preferable that the model matching unit 20 sequentially select the characteristic points in order from a characteristic point located lowest in the vertical direction illustrated in FIG. 7 to a characteristic point located highest in the vertical direction illustrated in FIG. 7. Alternatively, it is preferable that the model matching unit 20 sequentially select the characteristic points in order from a characteristic point that is farthest from the road surface or whose y coordinate on the screen is the largest. For example, it is preferable that the model matching unit 20 sequentially select the characteristic points in order from the characteristic point located highest in the vertical direction illustrated in FIG. 7 to the characteristic point located lowest in the vertical direction illustrated in FIG. 7. According to any of these methods, since the model matching unit 20 sequentially select the characteristic points in ascending order of y coordinate on the screen or in descending order of y coordinate on the screen, a position at which a deviation that is described later significantly changes may be easily identified and a process of separating an object candidate into two parts may be easily executed. The process of separating an object candidate into two parts is described later.

Subsequently, the model matching unit 20 calculates deviations between the flow difference distribution of the object candidate and the multiple flow difference distribution models at the selected characteristic point (in S504).

Then, the model matching unit 20 determines whether or not the number of selected characteristic points is equal to or larger than a predetermined number (in S505). If the model matching unit 20 determines that the number of the selected characteristic points is smaller than the predetermined number (No in S505), the process returns to S501 and the model matching unit 20 executes the processes of S501 and later. On the other hand, if the model matching unit 20 determines that the number of the selected characteristic points is equal to or larger than the predetermined number (Yes in S505), the model matching unit 20 selects, from among the multiple flow difference distribution models, a flow difference distribution model of which a deviation from the flow difference distribution of the object candidate is the smallest (in S506). Specifically, the model matching unit 20 treats, as deviations, values each obtained by accumulating or averaging deviations calculated for the characteristic points, compares the flow difference distribution of the object candidate with the flow difference distribution models, and thereby selects the flow difference distribution model of which the deviation from the flow difference distribution model for the object candidate is the smallest.

Then, the model matching unit 20 determines whether or not the deviation used in the process of S506 is smaller than a threshold (in S507). If the model matching unit 20 determines that the deviation is smaller than the threshold (Yes in S507), the model matching unit 20 determines the flow difference distribution model selected in S506 as a flow difference distribution model corresponding to the object candidate. In this manner, the flow difference distribution model is determined as the flow difference distribution model corresponding to the object candidate after the comparison of the deviation of the selected flow difference distribution model with the threshold. Thus, the flow difference distribution model may be determined without an error. As described later, the fact that the object candidate is composed of multiple objects may be detected.

If the model matching unit 20 determines that the deviation is not smaller than the threshold (No in S507), the object candidate is treated to be composed of multiple objects and the process of separating the object candidate is executed (in S508). The process of separating the object candidate is described below.

Figure 21A:
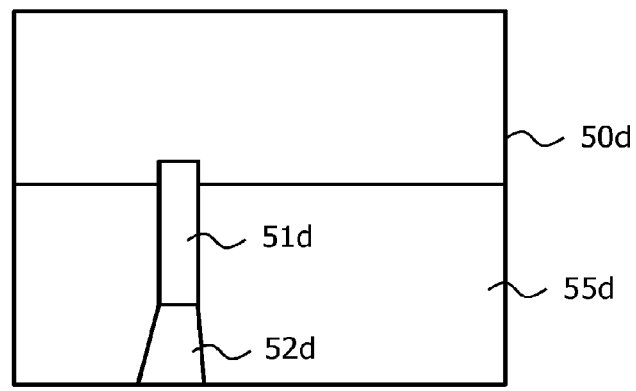
FIGS. 21A, 21B, and 21C are diagrams illustrating an example of an image, an object candidate, and a flow difference distribution in a case where an image of a road surface pattern and an image of a cubic object overlap each other on a screen.
Figure 21B:
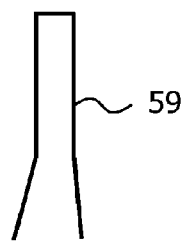
Figure 21C:
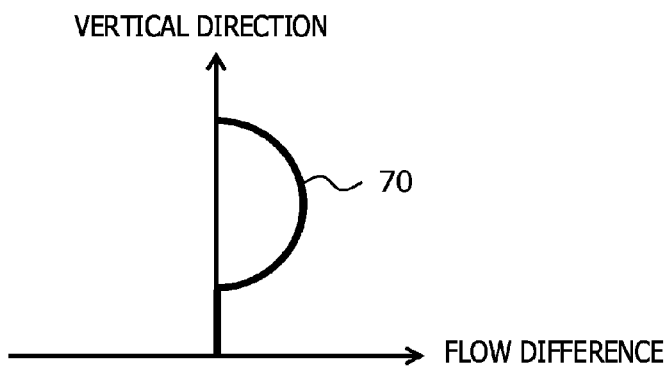

FIGS. 21A, 21B, and 21C are diagrams illustrating an example of an image, an object candidate, and a flow difference distribution in a case where an image of the road surface pattern and an image of the cubic object overlap each other on the screen. As illustrated in FIG. 21A, an image 50d includes images of a cubic object 51d, a road surface pattern 52d, and a road surface 55d. If the cubic object 51d exists on the road surface pattern 52d or the road surface pattern 52d exists at the back of the cubic object 51d with respect to the camera 30, an image of an object obtained by coupling the cubic object 51*d* to the road surface pattern 52*d* is obtained, as illustrated in FIG. 21A. Thus, as illustrated in FIG. 21B, an object candidate 59 that has a contour obtained by coupling the cubic object 51*d* to the road surface pattern 52*d* may be extracted in S103.

In this case, as a flow difference distribution of the object candidate 59, a flow difference distribution 70 illustrated in FIG. 21C is generated in S106, for example. The flow difference distribution 70 is a complex distribution obtained by coupling a flow difference distribution of the road surface pattern 52*d* to a flow difference distribution of the cubic object 51*d*. When the matching process of S107 is executed using the complex distribution, it is difficult to find a similar flow difference distribution model. Thus, when the object candidate 59 is detected, the model matching unit 20 detects the cubic object and the road surface pattern while distinguishing the cubic object and the road surface pattern from each other and thus separates the object candidate into the two parts.

FIGS. 22A, 22B, 22C, and 22D are diagrams illustrating an example of the detection of the object candidate composed of the road surface pattern and the cubic object and an example of the separation method.

Figure 22A:
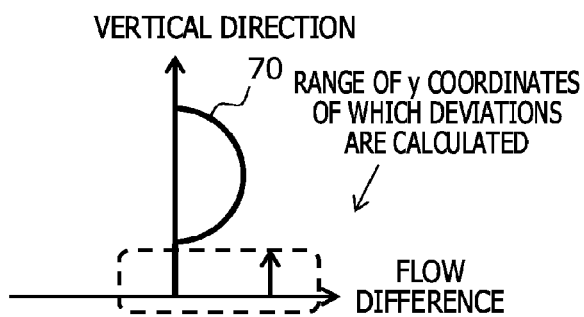
FIGS. 22A, 22B, 22C, and 22D are diagrams describing an example of the detection of an object candidate composed of a road surface pattern and a cubic object and an example of a separation method.

As illustrated in FIG. 22A, if y coordinates of the flow difference distribution 70 are selected in ascending order of y coordinate on the screen, y coordinates of characteristic points forming the road surface pattern are selected at an initial stage of the process. In this case, since flow differences corresponding to the selected y coordinates substantially match flow differences corresponding to the y coordinates of the flow difference distribution model for the road surface pattern, deviations are substantially zero.

Figure 22B:
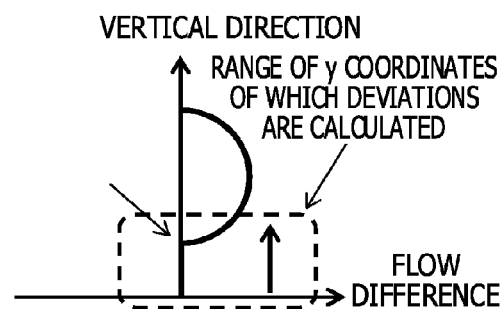
Figure 22C:
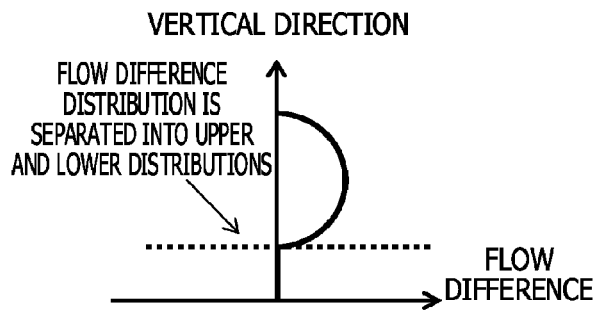
Figure 22D:
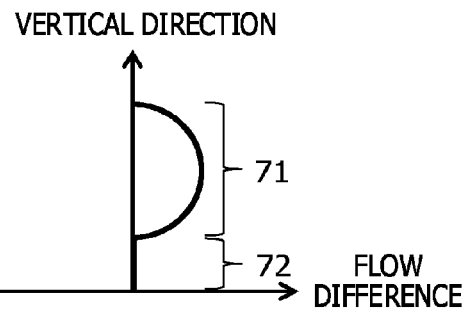

However, when the selection of y coordinates of characteristic points forming the cubic object is started due to an increase in a value of a selected y coordinate, a deviation between a flow difference corresponding to the selected y coordinate and a flow difference corresponding to the y coordinate of the flow difference distribution model for the road surface pattern rapidly increases at a start point at which the selection is started, as illustrated in FIG. 22B. Thus, the model matching unit 20 separates the flow difference distribution 70 into upper and lower distributions at the start point as illustrated in FIG. 22C so as to generate the flow difference distributions 71 and 72 as illustrated in FIG. 22D. The flow difference distributions 71 and 72 correspond to flow difference distributions of the two object candidates obtained by separating the object candidate 59.

After that, the process of determining a flow difference distribution model in S107 is executed on each of the two object candidates. Referring to the multiple flow difference distribution models illustrated in FIGS. 15A to 15C, 17A to 17C, and 19A to 19C, the lower flow difference distribution 72 is similar to the flow difference distribution of the road surface pattern. Thus, the flow difference distribution model of the road surface pattern is determined as a flow difference distribution model corresponding to the lower object candidate. Referring to the multiple flow difference distribution models illustrated in FIGS. 15A to 15C, 17A to 17C, and 19A to 19C, the upper flow difference distribution 71 is similar to the flow difference distribution of the cubic object. Thus, the flow difference distribution model of the cubic object is determined as the flow difference distribution model corresponding to the upper object candidate. In the case where the object candidate 59 is composed of the cubic object and the road surface pattern, the cubic object and the road surface pattern may be detected by the separation of the object candidate 59 while being distinguished from each other.

Return to FIG. 14. In S508, the model matching unit 20 separates the object candidate based on information of the deviations calculated in S504. Specifically, the model matching unit 20 references a change, caused by an increase in a value of a y coordinate, in a deviation and separates the object candidate into upper and lower parts at a point at which the deviation changes from a level equal to or lower than the threshold to a level higher than the threshold. After the process of S508, the process returns to S501, and the model matching unit 20 executes the processes of S501 and later.

If the model matching unit 20 determines that the deviation is smaller than the threshold (Yes in S507), the model matching unit 20 determines whether or not all the object candidates are already selected (in S509). If the model matching unit 20 determines that at least any of all the object candidates is not selected (No in S509), the process returns to S501, and the model matching unit 20 executes the processes of S501 and later. On the other hand, if the model matching unit 20 determines that all the object candidates are already selected (Yes in S509), the process of S107 is terminated and the process proceeds to S108. In this manner, the model matching unit 20 executes the model matching process.

Return to FIG. 3. After the process of S107, if an object candidate determined to be a cubic object exists among the object candidates extracted in S103, the output unit 21 outputs the result of the determination (in S108). Specifically, if an object candidate corresponding to a flow difference distribution model for the cubic object exists among the object candidates as a result of the process of S107, the output unit 21 outputs information indicating that the cubic object is detected.

In the aforementioned manner, the process of detecting a cubic object is executed by the object detecting device 100.

Figure 23A:
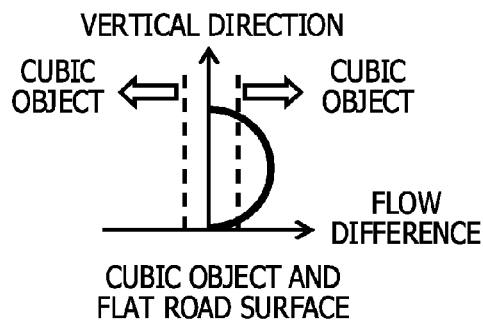
FIGS. 23A, 23B, 23C, and 23D are diagrams describing a problem occurred when a process of detecting a cubic object is executed without consideration of a slope of a road surface.
Figure 23B:
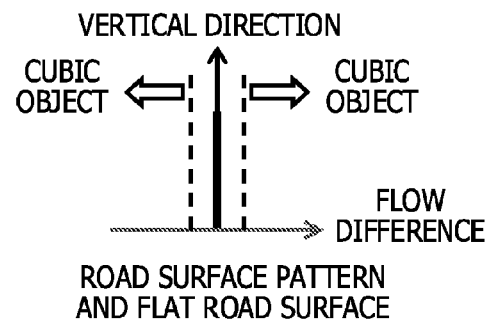
Figure 23C:
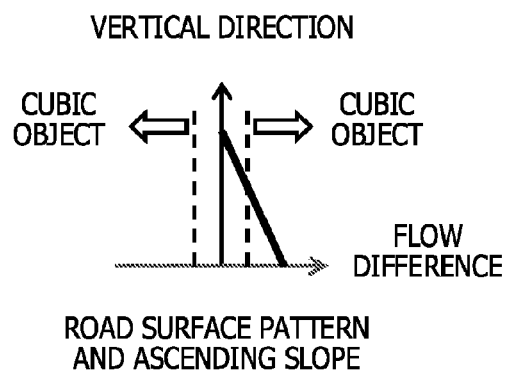
Figure 23D:
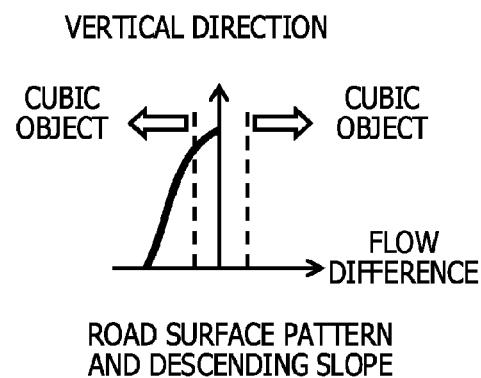

FIGS. 23A, 23B, 23C, and 23D are diagrams describing a problem occurred when the process of detecting a cubic object is executed without consideration of a slope of a road surface. FIG. 23A illustrates an example of a flow difference distribution model for a cubic object on a flat road surface. FIG. 23B illustrates an example of a flow difference distribution model for a road surface pattern on the flat road surface. FIG. 23C illustrates an example of a flow difference distribution model for the road surface pattern on a road surface including an ascending slope. FIG. 23D illustrates an example of a flow difference distribution model for the road surface pattern on a road surface including a descending slope.

Two dotted lines illustrated in each of FIGS. 23A to 23D indicate flow difference thresholds to be used to determine whether or not an object candidate is a cubic object. If a profile of a flow difference distribution model for an object candidate is in a range between the two dotted lines, the object candidate is determined not to be a cubic object. On the other hand, if the profile of the flow difference distribution model for the object candidate is not in the range between the two dotted lines or if a part of the profile is outside the range between the two dotted lines, the object candidate is determined to be a cubic object.

In the example illustrated in FIG. 23A, since a part of the profile is not in the range on the right side of the right dotted line, the object candidate is determined to be a cubic object. In the example illustrated in FIG. 23B, since the profile is in the range between the two dotted lines, the object candidate is determined not to be a cubic object. In this manner, the aforementioned determination method is effective to detect a cubic object in the case where the road surface is flat.

However, if the road surface includes a slope, an object candidate may be erroneously detected as a cubic object, regardless of the fact that the object candidate is a road surface pattern. For example, if the road surface includes an ascending slope, a part of the profile of a flow difference distribution model for the road surface pattern is not in the range on the right side of the right dotted line, as illustrated in FIG. 23C. Thus, the object candidate is detected as a cubic object, regardless of the fact that the object candidate is actually the road surface pattern. If the road surface includes a descending slope, the profile of the flow difference distribution model for the road surface pattern is not in the range on the side of the left dotted line, as illustrated in FIG. 23D. Thus, the object candidate is detected as a cubic object, regardless of the fact that the object candidate is actually the road surface pattern.

According to the first embodiment, multiple flow difference distribution models with difference profiles are generated for the combinations of the object candidate types and the road surface's inclined state types based on the positions of an object candidate within acquired images. Then, a flow difference distribution model that is the most similar model to a flow difference distribution of the object candidate is extracted from the generated flow difference distribution models and determined. By this method, the aforementioned problem with erroneous detection may be solved, and the existence of a cubic object may be detected while being distinguished from a road surface pattern, regardless of an inclined state of a road surface.

Second Embodiment

Next, a second embodiment is described. In the first embodiment, after a model that is similar to an acquired flow difference distribution is selected for each of all object candidates from among multiple flow difference distribution models and determined in S107 illustrated in FIG. 3, whether or not an object candidate determined to be a cubic object exists is determined in S108. On the other hand, in the second embodiment, every time a flow difference distribution model corresponding to an object candidate is determined, whether or not the object candidate is a cubic object is determined. An object detecting device that is configured to achieve the second embodiment may have the configuration of the object detecting device exemplified in FIGS. 1 and 2, and a description thereof is omitted.

FIG. 24 is a flowchart of an example of a method of detecting a cubic object by the object detecting device according to the second embodiment.

Processes of S101 to S106 are the same as or similar to the processes of S101 to S106 executed in the first embodiment, and a description thereof is omitted. After S106, the model matching unit 20 compares each of the flow difference distributions generated in S106 with multiple flow difference distribution models and determines flow difference distribution models corresponding to the object candidates. Then, if at least any of the determined models is related to a cubic object, the output unit 21 outputs information indicating that the cubic object is detected (in S107a). The process of S107a is described below.

Figure 25:
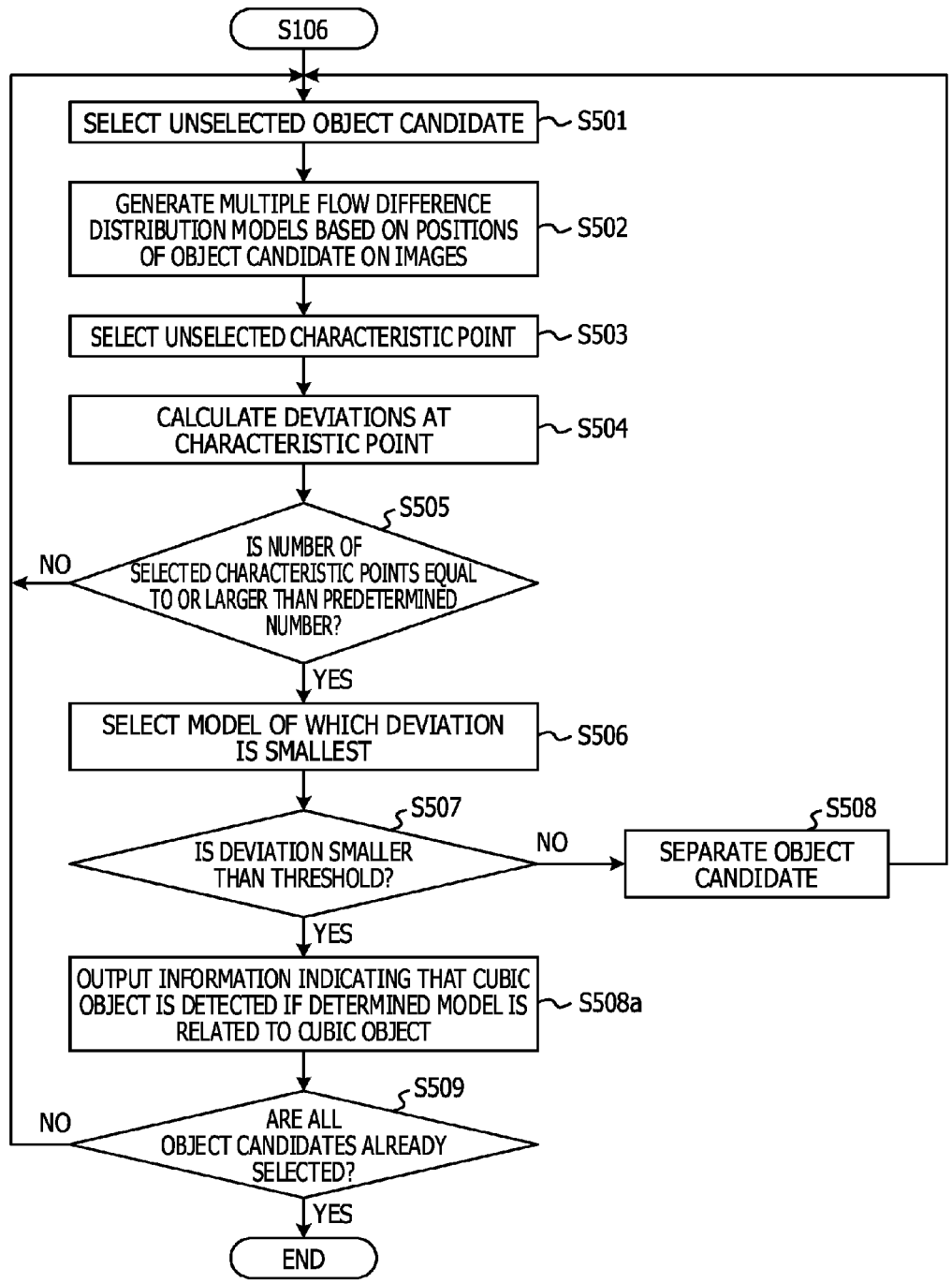
FIG. 25 is a flowchart of an example of a model matching process and a process of detecting a cubic object according to the second embodiment.

FIG. 25 is a flowchart of an example of a model matching process and a process of detecting a cubic object according to the second embodiment.

Processes of S501 to S506 are the same as or similar to the processes of S501 to S506 described in the first embodiment, and a description thereof is omitted. After S506, the model matching unit 20 determines whether or not the deviation used in the process of S506 is smaller than the threshold (in S507). If the model matching unit 20 determines that the deviation is not smaller than the threshold (No in S507), the model matching unit 20 executes the process of separating the object candidate (in S508). The process of S508 is the same as the process executed in the first embodiment, and a description thereof is omitted.

If the model matching unit 20 determines that the deviation is smaller than the threshold (Yes in S507), the model matching unit 20 determines the flow difference distribution model selected in S506 as a flow difference distribution model corresponding to the object candidate. Then, if the determined flow difference distribution model is related to the cubic object, the output unit 21 outputs information indicating that the cubic object is detected (in S508a). After that, the model matching unit 20 determines whether or not all the object candidates are already selected (in S509). If the model matching unit 20 determines that at least any of all the object candidates is not selected (No in S509), the process returns to S501, and the model matching unit 20 executes the processes of S501 and later. On the other hand, if the model matching unit 20 determines that all the object candidates are already selected (Yes in S509), the process of detecting a cubic object by the object detecting device 100 is terminated.

In the aforementioned manner, the process of detecting a cubic object according to the second embodiment is executed.

According to the second embodiment, every time a flow difference distribution model corresponding to an object candidate is determined, whether or not the object candidate is a cubic object is determined. According to this method, when a cubic object is detected, the object detecting device outputs information indicating that the cubic object is detected without waiting for the termination of the process of determining flow difference distribution models for all object candidates. Thus, the timing of outputting the result of detecting a cubic object may be earlier than that in the first embodiment.

Although the embodiments are described above, the embodiments are not limited to the above description and may be variously modified and changed. For example, if an image that depicts a known road surface pattern is included in each of acquired images, a flow difference distribution model for the road surface pattern may be generated based on the images.

In the described embodiments, when the image input unit 12 receives images from the imager 11, multiple flow difference distribution models are generated based on an object candidate within the images. Typical flow difference distribution models based on the object candidate types and the road surface's inclined state types may be stored in a memory or the like in advance, and the model matching unit 20 may execute the model matching process while referencing the typical flow difference distribution models. According to this method, the process of generating multiple flow difference distribution models may be omitted and a speed at which an object is detected may be improved.

The cubic objects described in the embodiments may include an object protruding from a ceiling of an indoor space of a building or hung from the ceiling or an object protruding from a side wall of the indoor space of the building.

A computer program that is configured to cause a computer to enable each of the aforementioned object detecting devices to operate and is configured to cause the computer to execute the information processing method, and a non-temporary computer-readable storage medium storing the program, are included in the scope of the embodiments. The non-temporary computer-readable storage medium is a memory card such as an SD memory card, for example. The computer program is not limited to the program stored in the storage medium and may be transferred through a network represented by an electric communication line, a wireless or wired communication line, the Internet, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An object detection method executed by a processor included in an object detecting device having a camera attached to a moving object, the object detection method comprising:
   extracting a plurality of characteristic points from two images acquired at different times by the camera upon a movement of the moving object;
   extracting an object candidate by grouping the plurality of characteristic points;
   calculating, for each of characteristic points included in the object candidate, an observation flow amount indicating an amount of positional shift of a characteristic point on the two images;
   calculating, for each of the characteristic points included in the object candidate, a virtual road surface flow amount indicating an amount of positional shift of the characteristic point on the two images while assuming that the characteristic point is located on a road surface;
   generating, for each of the characteristic points included in the object candidate, a flow difference distribution of the object candidate by calculating a difference between the observation flow amount and the virtual road surface flow amount; and
   determining whether the object candidate is an object existing on and protruding from the road surface by comparing the flow difference distribution with a plurality of flow difference distribution models generated for predicted inclined states of the surface and corresponding to at least any of a case where the object candidate is the object existing along the road surface and a case where the object candidate is the object existing on and protruding from the road surface.

2. The object detection method according to claim 1, wherein the determining includes
   identifying, based on similarities between the plurality of flow difference distribution models and the generated flow difference distribution, a flow difference distribution model corresponding to the object candidate from among the plurality of flow difference distribution models, and
   determining that the object candidate is the object existing on and protruding from the surface when it is determined that the flow difference distribution model is related to the object existing on and protruding from the road surface.

3. The object detection method according to claim 2, wherein the determining includes
   selecting, from among the plurality of flow difference distribution models, a flow difference distribution model of which a deviation from the generated flow difference distribution is the smallest, and
   determining the selected flow difference distribution model as a flow difference distribution model corresponding to the object candidate when the deviation of the selected flow difference distribution model is smaller than a predetermined threshold.

4. The object detection method according to claim 3, wherein the determining includes
   separating the flow difference distribution into a plurality of flow difference distributions when the deviation of the selected flow difference distribution model is larger than the predetermined threshold, and
   comparing the plurality of flow difference distributions with the plurality of flow difference distribution models and thereby determining whether each of images corresponding to the plurality of flow difference distributions are images of the object existing on and protruding from the road surface.

5. The object detection method according to claim 4, wherein the separating includes
   acquiring the deviation at predetermined time intervals while increasing a coordinate value in a predetermined coordinate axis direction, and
   separating the flow difference distribution into two flow difference distributions in a direction perpendicular to the predetermined coordinate axis direction at a position at which the deviation changes from a level equal to or smaller than the predetermined threshold to a level higher than the predetermined threshold.

6. The object detection method according to claim 1, further comprising:
   identifying a flow difference distribution model corresponding to a first object from among the plurality of flow difference distribution models when a plurality of object candidates including the first object and a second object is extracted from the plurality of images;
   determining whether the first object is the object existing on and protruding from the road surface;
   identifying a flow difference distribution model corresponding to the second object from among the plurality of flow difference distribution models; and
   determining whether the second object is the object existing on and protruding from the road surface.

7. The object detection method according to claim 1, wherein the object that exists on the road surface while protruding from the surface is a cubic object and the object that exists along the road surface is a road surface pattern.

8. The object detection method according to claim 1, wherein the plurality of flow difference distribution models is generated for combinations of object types and the inclined states of the surface.

9. An information processing device comprising:
   a camera; and
   a processor coupled to the camera and configured to
   extract a plurality of characteristic points from two images acquired at different times by the camera upon a movement of the moving object, extract an object candidate by grouping the plurality of characteristic points, calculate, for each of characteristic points included in the object candidate, an observation flow amount indicating an amount of positional shift of a characteristic point on the two images, calculate, for each of the characteristic points included in the object candidate, a virtual road surface flow amount indicating an amount of positional shift of the characteristic point on the two images while assuming that the characteristic point is located on a road surface, generate, for each of the characteristic points included in the object candidate, a flow difference distribution of the object candidate by calculating a difference between the observation flow amount and the virtual road surface flow amount, and determine whether the object candidate is an object existing on and protruding from the road surface by comparing the flow difference distribution with a plurality of flow difference distribution models generated for predicted inclined states of the surface and corresponding to at least any of a case where the object candidate is the object existing along the road surface and a case where the object candidate is the object existing on and protruding from the road surface.

10. A non-transitory computer-readable storage medium storing a program that causes a processor included in a computer to execute a process, the process comprising:

extracting a plurality of characteristic points from two images acquired at different times by the camera upon a movement of the moving object;

extracting an object candidate by grouping the plurality of characteristic points;

calculating, for each of the plurality of characteristic points, an observation flow amount indicating an amount of positional shift of a characteristic point on the two images;

calculating, for each of the plurality of characteristic points, a virtual road surface flow amount indicating an amount of positional shift of the characteristic point on the two images while assuming that the characteristic point is located on a road surface;

generating, for each of the plurality of characteristic points, a flow difference distribution of the object candidate by calculating a difference between the observation flow amount and the virtual road surface flow amount; and determining whether the object candidate is an object existing on and protruding from the road surface by comparing the flow difference distribution with a plurality of flow difference distribution models generated for predicted inclined states of the surface and corresponding to at least any of a case where the object candidate is the object existing along the road surface and a case where the object candidate is the object existing on and protruding from the road surface.

* * * * *